(12) United States Patent
Shaw et al.

(10) Patent No.: US 10,973,083 B2
(45) Date of Patent: *Apr. 6, 2021

(54) MULTIPLE MESH DRONE COMMUNICATION

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US); Zhi Cui, Sugar Hill, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,924

(22) Filed: Sep. 25, 2019

(65) Prior Publication Data

US 2020/0146102 A1 May 7, 2020

Related U.S. Application Data

(63) Continuation of application No. 15/352,559, filed on Nov. 15, 2016, now Pat. No. 10,470,241.

(51) Int. Cl.
*H04W 84/18* (2009.01)
*H04W 4/40* (2018.01)
(Continued)

(52) U.S. Cl.
CPC .............. *H04W 84/18* (2013.01); *H04W 4/40* (2018.02); *H04W 4/08* (2013.01); *H04W 8/186* (2013.01)

(58) Field of Classification Search
CPC ........... H04W 4/40; H04W 4/44; H04W 4/46; H04W 84/18
See application file for complete search history.

(56) References Cited

U.S. PATENT DOCUMENTS

| 4,334,221 A | 6/1982 | Rosenhagen et al. |
| 4,829,565 A | 5/1989 | Goldberg |

(Continued)

FOREIGN PATENT DOCUMENTS

| CA | 2 770 069 A1 | 2/2011 |
| EP | 0 167 625 A1 | 1/1986 |

(Continued)

OTHER PUBLICATIONS

U.S. Appl. No. 15/352,559, filed Nov. 15, 2016.

(Continued)

*Primary Examiner* — Ashley Shivers
(74) *Attorney, Agent, or Firm* — Amin, Turocy & Watson, LLP

(57) ABSTRACT

Communication between drones of multiple drone meshes is disclosed. Attributes of drones can be cataloged by a network device. A portion of the drone attribute catalog can be received by a drone belonging to a drone mesh. The drone can determine, based on the portion of the drone attribute catalog, an adaptation to the drone mesh in response to a change in a status of a drone of the drone mesh. The adaptation of the drone mesh can comprise adding a drone to the drone mesh, removing drone from the drone mesh, merging the drone mesh with another drone mesh, splitting the drone mesh into a plurality of drone meshes, forming a submesh of the drone mesh, etc. Receiving the portion of the drone attribute catalog can facilitate self-organization and/or self-optimization of a drone mesh by drones comprising the drone mesh. A drone can concurrently be a member of one or more drone meshes as a result of the adaptation of the drone mesh.

20 Claims, 10 Drawing Sheets

(51) Int. Cl.
*H04W 4/08* (2009.01)
*H04W 8/18* (2009.01)

(56) References Cited

U.S. PATENT DOCUMENTS

| | | |
|---|---|---|
| 5,404,516 A | 4/1995 | Georgiades et al. |
| 5,905,461 A | 5/1999 | Neher |
| 6,085,216 A | 7/2000 | Huberman et al. |
| 6,226,622 B1 | 5/2001 | Dabbiere |
| 6,300,875 B1 | 10/2001 | Schafer |
| 6,356,841 B1 | 3/2002 | Hamrick et al. |
| 6,388,612 B1 | 5/2002 | Neher |
| 6,720,879 B2 | 4/2004 | Edwards |
| 6,813,498 B1 | 11/2004 | Durga et al. |
| 6,819,982 B2 | 11/2004 | Doane |
| 6,957,217 B2 | 10/2005 | Raverdy et al. |
| 6,985,810 B2 | 1/2006 | Moitra et al. |
| 7,099,921 B1 | 8/2006 | Engstrom et al. |
| 7,117,067 B2 | 10/2006 | Mclurkin et al. |
| 7,130,741 B2 | 10/2006 | Bodin et al. |
| 7,149,611 B2 | 12/2006 | Beck et al. |
| 7,203,502 B2 | 4/2007 | Wilson et al. |
| 7,236,858 B2 | 6/2007 | Carpenter et al. |
| 7,252,265 B2 | 8/2007 | Perlo et al. |
| 7,253,731 B2 | 8/2007 | Joao |
| 7,259,668 B2 | 8/2007 | Casey |
| 7,379,743 B2 | 5/2008 | Bostrom et al. |
| 7,492,251 B1 | 2/2009 | Katz |
| 7,551,126 B2 | 6/2009 | Loomis et al. |
| 7,551,577 B2 | 6/2009 | Mcrae |
| 7,583,632 B2 | 9/2009 | Janevski et al. |
| 7,602,302 B2 | 10/2009 | Hokuf et al. |
| 7,728,724 B1 | 6/2010 | Scalisi et al. |
| 7,830,305 B2 | 11/2010 | Boling et al. |
| 7,831,259 B2 | 11/2010 | Cao et al. |
| 7,844,364 B2 | 11/2010 | Mclurkin et al. |
| 7,990,264 B2 | 8/2011 | Chou |
| 8,035,510 B2 | 10/2011 | Pfafman et al. |
| 8,045,980 B2 | 10/2011 | Buckley et al. |
| 8,059,631 B2 | 11/2011 | Anto Emmanuel |
| 8,060,270 B2 | 11/2011 | Vian et al. |
| 8,073,467 B2 | 12/2011 | Gupta et al. |
| 8,160,606 B2 | 4/2012 | Shrivathsan et al. |
| 8,213,458 B2 | 7/2012 | Norby |
| 8,238,935 B2 | 8/2012 | Chen et al. |
| 8,255,470 B2 | 8/2012 | Jackson et al. |
| 8,260,485 B1 | 9/2012 | Meuth et al. |
| 8,275,352 B2 | 9/2012 | Forstall et al. |
| 8,290,513 B2 | 10/2012 | Forstall et al. |
| 8,301,158 B1 | 10/2012 | Thomas |
| 8,315,800 B2 | 11/2012 | Sanchez et al. |
| 8,315,905 B1 | 11/2012 | Adair |
| 8,364,170 B2 | 1/2013 | Lohtia et al. |
| 8,369,867 B2 | 2/2013 | Van Os et al. |
| 8,439,301 B1 | 5/2013 | Lussier et al. |
| 8,442,005 B2 | 5/2013 | Dutta et al. |
| 8,442,483 B2 | 5/2013 | Gunasekara |
| 8,442,807 B2 | 5/2013 | Ramachandran |
| 8,446,272 B2 | 5/2013 | Raduchel |
| 8,447,325 B2 | 5/2013 | Anakata et al. |
| 8,514,058 B2 | 8/2013 | Cameron |
| 8,521,328 B2 | 8/2013 | Jang |
| 8,531,294 B2 | 9/2013 | Slavin et al. |
| 8,558,694 B2 | 10/2013 | Brandt et al. |
| 8,559,925 B2 | 10/2013 | Zhang |
| 8,565,176 B2 | 10/2013 | Norlén et al. |
| 8,565,735 B2 | 10/2013 | Wohlwend et al. |
| 8,565,780 B2 | 10/2013 | Soelberg et al. |
| 8,589,488 B2 | 11/2013 | Huston et al. |
| 8,606,612 B2 | 12/2013 | de Silva et al. |
| 8,644,847 B1 | 2/2014 | Nelissen et al. |
| 8,649,774 B1 | 2/2014 | Zheng et al. |
| 8,665,089 B2 | 3/2014 | Saigh et al. |
| 8,676,406 B2 | 3/2014 | Coffman et al. |
| 8,686,852 B2 | 4/2014 | Ben-Dayan et al. |
| 8,700,659 B2 | 4/2014 | Skeen et al. |
| 8,725,165 B2 | 5/2014 | Lau et al. |
| 8,761,797 B1 | 6/2014 | Norton |
| 8,768,375 B2 | 7/2014 | Farmer |
| 8,768,555 B2 | 7/2014 | Duggan et al. |
| 8,787,318 B2 | 7/2014 | Pampu et al. |
| 8,788,121 B2 | 7/2014 | Klinger |
| 8,799,476 B2 | 8/2014 | Karaoguz et al. |
| 8,817,707 B2 | 8/2014 | Gupta |
| 8,824,439 B2 | 9/2014 | Jiang et al. |
| 8,825,084 B2 | 9/2014 | Hymel et al. |
| 8,827,206 B2 | 9/2014 | Van Speybroeck et al. |
| 8,831,577 B2 | 9/2014 | Ginn et al. |
| 8,838,566 B2 | 9/2014 | Vaananen |
| 8,849,310 B2 | 9/2014 | Fan et al. |
| 8,886,584 B1 | 11/2014 | Kane, Jr. et al. |
| 8,903,426 B2 | 12/2014 | Tholkes et al. |
| 8,918,075 B2 | 12/2014 | Maier et al. |
| 8,924,250 B2 | 12/2014 | Bates et al. |
| 8,958,928 B2 | 2/2015 | Seydoux et al. |
| 8,965,598 B2 | 2/2015 | Kruglick |
| 8,989,773 B2 | 3/2015 | Sandel et al. |
| 9,258,761 B2 | 2/2016 | Bertrand et al. |
| 9,456,298 B2 | 9/2016 | Lee et al. |
| 9,524,648 B1 | 12/2016 | Gopalakrishnan et al. |
| 9,629,076 B2 | 4/2017 | Shaw et al. |
| 9,936,010 B1 | 4/2018 | Robbins et al. |
| 9,961,625 B2 | 5/2018 | Shaw et al. |
| 2002/0161862 A1 | 10/2002 | Horvitz |
| 2003/0114171 A1 | 6/2003 | Miyamoto |
| 2004/0030571 A1 | 2/2004 | Solomon |
| 2004/0073784 A1 | 4/2004 | Ishidoshiro |
| 2004/0185875 A1 | 9/2004 | Diacakis et al. |
| 2005/0048918 A1 | 3/2005 | Frost et al. |
| 2005/0105496 A1 | 5/2005 | Ambrosino |
| 2006/0114324 A1 | 6/2006 | Farmer et al. |
| 2007/0146199 A1 | 6/2007 | Huang et al. |
| 2007/0171818 A1 | 7/2007 | Shoji et al. |
| 2007/0214073 A1 | 9/2007 | Smith |
| 2007/0284474 A1 | 12/2007 | Olson et al. |
| 2008/0032703 A1 | 2/2008 | Krumm et al. |
| 2008/0135687 A1 | 6/2008 | Penzo |
| 2008/0144884 A1 | 6/2008 | Habibi |
| 2008/0153511 A1 | 6/2008 | Mock |
| 2008/0194273 A1 | 8/2008 | Kansal et al. |
| 2008/0262717 A1 | 10/2008 | Ettinger |
| 2009/0086973 A1 | 4/2009 | Buddhikot et al. |
| 2009/0156231 A1 | 6/2009 | Versteeg et al. |
| 2009/0215469 A1 | 8/2009 | Fisher et al. |
| 2009/0219393 A1 | 9/2009 | Vian et al. |
| 2009/0248587 A1 | 10/2009 | Van Buskirk |
| 2009/0315704 A1 | 12/2009 | Rosing et al. |
| 2010/0024045 A1 | 1/2010 | Sastry et al. |
| 2010/0217525 A1 | 8/2010 | King et al. |
| 2010/0240370 A1 | 9/2010 | Pandit et al. |
| 2010/0250022 A1 | 9/2010 | Hines et al. |
| 2011/0035284 A1 | 2/2011 | Moshfeghi |
| 2011/0053605 A1 | 3/2011 | Carpio et al. |
| 2011/0072101 A1 | 3/2011 | Forsell et al. |
| 2011/0083101 A1 | 4/2011 | Sharon et al. |
| 2011/0090870 A1 | 4/2011 | Rönneke et al. |
| 2011/0105143 A1 | 5/2011 | Harple et al. |
| 2011/0176424 A1 | 7/2011 | Yang et al. |
| 2011/0196912 A1 | 8/2011 | Payton et al. |
| 2011/0207440 A1 | 8/2011 | Ruuspakka et al. |
| 2011/0234399 A1 | 9/2011 | Yan |
| 2011/0238476 A1 | 9/2011 | Carr et al. |
| 2011/0258049 A1 | 10/2011 | Ramer et al. |
| 2011/0295677 A1 | 12/2011 | Dhingra et al. |
| 2011/0301784 A1 | 12/2011 | Oakley et al. |
| 2012/0004791 A1 | 1/2012 | Buelthoff et al. |
| 2012/0029731 A1 | 2/2012 | Waldock et al. |
| 2012/0058762 A1 | 3/2012 | Buckley et al. |
| 2012/0101818 A1 | 4/2012 | Scott et al. |
| 2012/0233067 A1 | 9/2012 | Matthew et al. |
| 2012/0265841 A1 | 10/2012 | Ross et al. |
| 2012/0271684 A1 | 10/2012 | Shutter |
| 2012/0284100 A1 | 11/2012 | Goldberg |
| 2012/0290336 A1 | 11/2012 | Rosenblatt et al. |

(56) References Cited

U.S. PATENT DOCUMENTS

| | | |
|---|---|---|
| 2013/0013412 A1 | 1/2013 | Altman et al. |
| 2013/0034019 A1 | 2/2013 | Mustajarvi |
| 2013/0039353 A1 | 2/2013 | Franco et al. |
| 2013/0060640 A1 | 3/2013 | Gadhia et al. |
| 2013/0070641 A1 | 3/2013 | Meier et al. |
| 2013/0077482 A1 | 3/2013 | Krishna et al. |
| 2013/0090980 A1 | 4/2013 | Hummel |
| 2013/0107702 A1 | 5/2013 | Gupta et al. |
| 2013/0109302 A1 | 5/2013 | Levien et al. |
| 2013/0128815 A1 | 5/2013 | Scherzer et al. |
| 2013/0137423 A1 | 5/2013 | Das et al. |
| 2013/0142056 A1 | 6/2013 | Abplanalp et al. |
| 2013/0155849 A1 | 6/2013 | Koodli et al. |
| 2013/0155851 A1 | 6/2013 | Koodli et al. |
| 2013/0165120 A1 | 6/2013 | Nylander et al. |
| 2013/0166103 A1 | 6/2013 | Ko |
| 2013/0198397 A1 | 8/2013 | Zhang et al. |
| 2013/0198817 A1 | 8/2013 | Haddad et al. |
| 2013/0208693 A1 | 8/2013 | De La Forest Divonne et al. |
| 2013/0210385 A1 | 8/2013 | Ahmed et al. |
| 2013/0214925 A1 | 8/2013 | Weiss |
| 2013/0225161 A1 | 8/2013 | Chhabra et al. |
| 2013/0259020 A1 | 10/2013 | Ullah et al. |
| 2013/0304257 A1 | 11/2013 | Wang et al. |
| 2013/0304578 A1 | 11/2013 | Kannan et al. |
| 2013/0308622 A1 | 11/2013 | Uhlik |
| 2013/0332527 A1 | 12/2013 | Du et al. |
| 2013/0333016 A1 | 12/2013 | Coughlin et al. |
| 2013/0340013 A1 | 12/2013 | Chadha |
| 2014/0004854 A1 | 1/2014 | Veran et al. |
| 2014/0006069 A1 | 1/2014 | Guggenheim |
| 2014/0018976 A1 | 1/2014 | Goossen et al. |
| 2014/0019248 A1 | 1/2014 | Stoliartchouk et al. |
| 2014/0023059 A1 | 1/2014 | Gupta |
| 2014/0025233 A1 | 1/2014 | Levien et al. |
| 2014/0032034 A1 | 1/2014 | Raptopoulos et al. |
| 2014/0046802 A1 | 2/2014 | Hosein et al. |
| 2014/0074604 A1 | 3/2014 | Castillo et al. |
| 2014/0081479 A1 | 3/2014 | Vian et al. |
| 2014/0092886 A1 | 4/2014 | Gupta |
| 2014/0094195 A1 | 4/2014 | Luo et al. |
| 2014/0106743 A1 | 4/2014 | Ferraro Esparza et al. |
| 2014/0122040 A1 | 5/2014 | Marti |
| 2014/0126360 A1 | 5/2014 | Rong et al. |
| 2014/0126532 A1 | 5/2014 | Bapat et al. |
| 2014/0140575 A1 | 5/2014 | Wolf |
| 2014/0171024 A1 | 6/2014 | Huang et al. |
| 2014/0213295 A1 | 6/2014 | Conklin |
| 2014/0187252 A1 | 7/2014 | Gupta et al. |
| 2014/0192643 A1 | 7/2014 | Kalapatapu et al. |
| 2014/0200749 A1 | 7/2014 | Spilsbury |
| 2014/0206349 A1 | 7/2014 | Bertrand et al. |
| 2014/0206353 A1 | 7/2014 | Kim et al. |
| 2014/0206439 A1 | 7/2014 | Tavano |
| 2014/0222562 A1 | 8/2014 | Akgul et al. |
| 2014/0241333 A1 | 8/2014 | Kim et al. |
| 2014/0254434 A1 | 9/2014 | Jain et al. |
| 2014/0254435 A1 | 9/2014 | Menendez et al. |
| 2014/0254478 A1 | 9/2014 | Deshpande et al. |
| 2014/0269654 A1 | 9/2014 | Canpolat et al. |
| 2014/0279014 A1 | 9/2014 | Roka et al. |
| 2014/0312165 A1 | 10/2014 | Mkrtchyan |
| 2014/0341076 A1 | 11/2014 | Orlandi et al. |
| 2014/0378162 A1 | 12/2014 | Shatsky et al. |
| 2015/0011241 A1 | 1/2015 | Papakipos et al. |
| 2015/0017943 A1 | 1/2015 | Mitchell, Jr. et al. |
| 2015/0020147 A1 | 1/2015 | Krishnan et al. |
| 2015/0065164 A1 | 3/2015 | Hoseinitabatabaei et al. |
| 2015/0066248 A1 | 3/2015 | Arbeit et al. |
| 2015/0101503 A1 | 4/2015 | Brown |
| 2015/0120094 A1 | 4/2015 | Kimchi et al. |
| 2015/0195759 A1 | 7/2015 | Sirotkin et al. |
| 2015/0195858 A1 | 7/2015 | Jin et al. |
| 2015/0223115 A1 | 8/2015 | Liang et al. |
| 2015/0236778 A1 | 8/2015 | Jalali |
| 2015/0264123 A1 | 9/2015 | Smadi et al. |
| 2015/0282058 A1 | 10/2015 | Forssell |
| 2015/0288797 A1 | 10/2015 | Vincent |
| 2015/0304885 A1 | 10/2015 | Jalali |
| 2015/0312808 A1 | 10/2015 | Kiss |
| 2015/0319102 A1 | 11/2015 | Esdaile et al. |
| 2015/0327067 A1 | 11/2015 | Shen et al. |
| 2015/0327136 A1 | 11/2015 | Kim et al. |
| 2015/0365351 A1 | 12/2015 | Suit |
| 2015/0373579 A1 | 12/2015 | Xu et al. |
| 2016/0035224 A1 | 2/2016 | Yang et al. |
| 2016/0035343 A1 | 2/2016 | Tang et al. |
| 2016/0050012 A1 | 2/2016 | Frolov et al. |
| 2016/0117355 A1 | 4/2016 | Krishnamurthy |
| 2016/0142884 A1 | 5/2016 | Sears |
| 2016/0253710 A1 | 9/2016 | Publicover et al. |
| 2016/0293018 A1 | 10/2016 | Kim et al. |
| 2016/0307449 A1 | 10/2016 | Gordon et al. |
| 2016/0337504 A1 | 11/2016 | Gilbert et al. |
| 2017/0323235 A1 | 11/2017 | Johnston et al. |
| 2018/0074520 A1 | 3/2018 | Liu et al. |
| 2018/0206110 A1 | 7/2018 | Chaki et al. |

FOREIGN PATENT DOCUMENTS

| | | |
|---|---|---|
| EP | 0 687 626 A1 | 12/1995 |
| EP | 2 706 790 A1 | 3/2014 |
| GB | 2 231 220 A | 11/1990 |
| GB | 2 473 825 A | 3/2011 |
| WO | 03/060847 A1 | 7/2003 |
| WO | 2007/004999 A1 | 1/2007 |
| WO | 2010/064548 A1 | 6/2010 |
| WO | 2012/148657 A1 | 11/2012 |
| WO | 2013/039573 A2 | 3/2013 |
| WO | 2013/134669 A1 | 9/2013 |
| WO | 2013/163746 A1 | 11/2013 |

OTHER PUBLICATIONS

Non-Final Office Action received for U.S. Appl. No. 14/817,800 dated Dec. 28, 2016, 27 pages.

Final Office Action received for U.S. Appl. No. 14/817,800 dated Jun. 14, 2017, 15 pages.

Non-Final Office Action received for U.S. Appl. No. 14/817,859 dated Dec. 26, 2017, 40 pages.

Non-Final Office Action received for U.S. Appl. No. 14/824,746 dated Mar. 19, 2018, 30 pages.

Final Office Action received for U.S. Appl. No. 14/817,859 dated Apr. 30, 2018, 32 pages.

Final Office Action received for U.S. Appl. No. 14/824,746 dated Aug. 24, 2018, 84 pages.

Non-Final Office Action received for U.S. Appl. No. 14/817,859 dated Oct. 3, 2018, 30 pages.

Non-Final Office Action received for U.S. Appl. No. 15/901,661 dated Sep. 14, 2018, 22 pages.

Final Office Action received for U.S. Appl. No. 14/817,859 dated Jan. 31, 2019, 26 pages.

Non-Final Office Action received for U.S. Appl. No. 14/817,859 dated Aug. 9, 2019, 27 pages.

Notice of Allowance received for U.S. Appl. No. 14/824,746 dated Jun. 12, 2019, 40 pages.

Final Office Action received for U.S. Appl. No. 14/817,859 dated Dec. 2, 2019, 36 pages.

Boddhu et al., "A Collaborative Smartphone Sensing Platform for Detecting and Tracking Hostile Drones", Ground/Air Multisensor Interoperability, Integration, and Networking for Persistent ISR IV, Proc. of SPIE vol. 8742, 874211, May 22, 2013, 11 pages.

Quaritsch et al., "Collaborative Microdrones: Applications and Research Challenges", Autonomics 2008, Sep. 23-25, 2008, Turin, Italy. 7 pages.

Nova et al., "The Impacts of Awareness Tools on Mutual Modelling in a Collaborative Video-Game", Groupware: Design, Implementation, and Use, vol. 2806 of the series Lecture Notes in Computer Science, Springer Berlin Heidelberg, 2003, 13 pages.

(56) References Cited

OTHER PUBLICATIONS

Choi et al., "Collaborative Tracking Control of UAV-UGV", World Academy of Science, Engineering and Technology, International Scholarly and Scientific Research & Innovation, vol. 6, No. 11, Nov. 11, 2012, 4 pages.
Zhao et al., "Standardization of Mobile Phone Positioning for 3G systems", IEEE Communications Magazine, Jul. 2002, pp. 108-116.
Paredes et al., "SOSPhone: a Mobile Application for Emergency Calls", Universal Access in the Information Society Aug. 2014, vol. 13, Issue 3, pp. 277-290.
D'Roza et al, "An Overview of Location-Based Services", BT Technology Journal, Jan. 2003, vol. 21, Issue 1, pp. 20-27.
Arminen, Ilkka. "Social functions of location in mobile telephony", Personal and Ubiquitous Computing, Aug. 2006, pp. 319-323.
Non-Final Office Action received for U.S. Appl. No. 14/732,631 dated Apr. 28, 2016, 35 pages.
Non-Final Office Action received for U.S. Appl. No. 14/530,593 dated Aug. 4, 2016, 34 pages.
Final Office Action received for U.S. Appl. No. 14/732,631 dated Sep. 21, 2016, 40 pages.
Morgenthaler et al. "UAVNet: A Mobile Wireless Mesh Network Using Unmanned Aerial Vehicles", Globecom Workshops, IEEE 2012, 6 pages.
Felice et al., "Self-Organizing Aerial Mesh Networks for Emergency Communication", IEEE 25th Annual International Symposium on Personal, Indoor, and Mobile Radio Communication (PIMRC). IEEE 2014, 6 pages.
Non-Final Rejection received for U.S. Appl. No. 14/732,626 dated Feb. 3, 2017, 125 pages.
Joseph et al., "Interoperability of WiFi Hotspots and Cellular Networks", Proceedings of the 2nd ACM International Workshop on Wireless mobile applications and services in WLAN hotspots, Oct. 2004, pp. 127-136.
Li et al., "Context-Aware Handoff on Smartphones", 2013 IEEE 10th International Conference on Mobile Ad-Hoc and Sensor Systems, Oct. 2013, pp. 470-478.
Tawil et al., "Distributed Handoff Decision Scheme using MIH Function for the Fourth Generation Wireless Networks", 2008 3rd International Conference on Information and Communication Technologies: From Theory to Applications, Apr. 2008, 6 pages.
Taleb et al., "On the Design of Energy-Aware 3G/WiFi Heterogeneous Networks under Realistic Conditions", 2013 27th International Conference on Advanced Information Networking and Applications Workshops, Mar. 2013, pp. 523-527.
Lee et al., "Economics of WiFi Offloading: Trading Delay for Cellular Capacity", IEEE Transactions on Wireless Communications, vol. 13, No. 3, Mar. 2014, pp. 1540-1554.
Kotwal et al., "Seamless Handoff between IEEE 802.11 and GPRS Networks", Distributed Computing and Internet Technology—Lecture Notes in Computer Science, Proceedings of the 6th International Conference, ICDCIT 2010, Feb. 2010, pp. 84-90.
Pyattaev et al., "3GPP LTE traffic offloading onto WiFi Direct", IEEE Wireless Communications and Networking Conference Workshops, Apr. 2013, pp. 135-140.
Yang et al., "A Performance Evaluation of Cellular/WLAN Integrated Networks", Fourth International Symposium on Parallel Architectures, Algorithms and Programming, Dec. 2011, pp. 131-135.
Bennis et al., "When Cellular Meets WiFi in Wireless Small Cell Networks", IEEE Communications Magazine, Jun. 2013, vol. 51, Issue 6, pp. 44-50.
Melzer et al., "Securing WLAN Offload of Cellular Networks using Subscriber Residential Access Gateways", IEEE International Conference on Consumer Electronics, Jan. 2011, pp. 905-906.
Non-Final Office Action received for U.S. Appl. No. 14/549,119 dated Jul. 14, 2016, 21 pages.
Non-Final Office Action received for U.S. Appl. No. 14/732,631 dated May 18, 2017, 51 pages.
Final Rejection received for U.S. Appl. No. 14/732,626 dated Jun. 27, 2017, 15 pages.
Final Office Action received for U.S. Appl. No. 14/732,631 dated Nov. 13, 2017, 51 pages.
Non-Final Office Action received for U.S. Appl. No. 15/476,956 dated Jan. 10, 2018, 35 pages.
Non-Final Rejection received for U.S. Appl. No. 14/732,626 dated Jan. 4, 2018, 28 pages.
Baxter et al., "Scheduling UAV Surveillance Tasks, Lessons Learnt from Trials with Users", IEEE International Conference on Systems, Man, and Cybernetics, 2013, pp. 2606-2610.
Non-Final Office Action received for U.S. Appl. No. 15/480,341 dated Aug. 8, 2017, 39 pages.
Notice of Allowance received for U.S. Appl. No. 14/732,631 dated Jun. 14, 2018, 38 pages.
Non-Final Office Action received for U.S. Appl. No. 15/944,733 dated May 23, 2019, 48 pages.
Non-Final Office Action received for U.S. Appl. No. 15/352,559 dated Sep. 5, 2018, 60 pages.
Final Office Action received for U.S. Appl. No. 15/352,559 dated Feb. 25, 2019, 30 pages.
Notice of Allowance received for U.S. Appl. No. 15/352,559 dated Jun. 21, 2019, 21 pages.
Spot, "Spot Ready for Adventure", URL: http://findmespot.com/en/index.php?cid=129, Spot Trace Sercices, Mar. 12, 2015, 1 page.
IOS 7, "Understanding Location Services", URL : https://support.apple.com/en-us/HT201357, Apple, support.apple.com, Mar. 12, 2015, 3 pages.
GPS, "Broadcom", URL : http://www.broadcom.com/products/GPS, Broadcom.com, Mar. 12, 2015, 1 page.
Google, "Enable Android location access", URL : https://support.google.com/coordinate/answer/2569281?hl=en, Support.Google.Com, Mar. 12, 2015, 2 pages.
About T-Mobile, "T-Mobile", URL : http://www.t-mobile.com/company/privacyresources.aspxtp=Abt_Tab_LocationServices, Mar. 12, 2015, 2 pages.
Emergency Beacons, NOAA: Search and Rescue Satellite Aided Tracking, http://www.sarsat.noaa.gov/emerbcns.html, Sarsat.Noaaa.Gov, Mar. 12, 2015, 2 pages.
Spyguy Security, "Outlander Real-Time GPS Tracker", URL : http://www.spyguysecurity.com/collections/gps-tracking/products/outlander-portable-real-time-gps-tracker, www.spyguysecurity.com, Mar. 13, 2015, 3 pages.
GPS Tracker, "Micro Tracker", URL : http://shop.spy-spot.com/gps-tracker, Spy Spot Investigation, shop.spy-spot.com, Mar. 13, 2015, 1 page.
Lightning GPS, "The Only Choice to Protect Your Business Assets", URL: http://www.lightninggps.com/gps_asset_tracking/, lightninggps.com, Mar. 13, 2015, 2 pages.
Steinfield, Charles, "The Development of Location Based Services in Mobile Commerce", URL http://link.springer.com/chapter/10.1007/978-3-662-11659-3_10, E-Life after the Dot Com Bust, Physica-Verlag HD, 2004, pp. 1-15.
Screenmedia Daily, "Free Trend Report: Why Location Is the New Currency of Marketing", URL : http://screenmediadaily.com/free-trend-report-why-location-is-the-new-currencyof-marketing/, screenmediadaily.com, Mar. 14, 2015, 8 pages.
Georgiev et al., "Where Businesses Thrive: Predicting the Impact of the Olympic Games on Local Retailers through Location-based Services Data", Mar. 29, 2014, 11 pages.
Dilmener et al., "Location Based Sales Promotion Strategies", International Conference on Marketing & Consumer Behavior, 2013, 13 pages.
Non-Final Office Action received for U.S. Appl. No. 16/132,189, dated Oct. 6, 2020, 82 pages.
Notice of Allowance dated Feb. 11, 2021 for U.S. Appl. No. 16/132,189, 40 pages.

MULTIPLE MESH DRONE COMMUNICATION

RELATED APPLICATION

The subject patent application is a continuation of, and claims priority to, U.S. patent application Ser. No. 15/352,559, filed Nov. 15, 2016, and entitled "MULTIPLE MESH DRONE COMMUNICATION," the entirety of which application is hereby incorporated by reference herein.

TECHNICAL FIELD

The disclosed subject matter relates to a remotely controlled vehicle, including a land, air, water, and/or space vehicle, e.g., a drone for terrestrial, aerial, aquatic, or space use. More particularly, the disclosed subject matter relates to communication between drones of one or more drone mesh network(s).

BACKGROUND

By way of brief background, conventional remotely controlled land, air, water, space vehicles, etc., often referred to as 'drones' or, in the case of flying devices, unmanned aerial vehicles (UAVs), generally can employ remote control operation and/or remote activation. As an example, a consumer drone product, such as a quad-copter, self-driving car, etc., can be operated via a remote control device, can be remotely deployed, etc. As another example, a military drone, such as a predator, global hawk, Robotic Mule (Legged Squad Support System (LS3)), etc., can be operated from a control center located remotely from the drone and can include instructions that direct the drone to operate in an autonomous or semi-autonomous mode, such as self-guided movement between designated waypoints. Conventionally, groups of drones can be directed to interact in a group, e.g., swarm-type autonomous behavior, etc. Conventionally, a group of drones typically operates with defined operational parameters, e.g., only specified models of drone can participate in the swarm, a fixed number of drones act as a swarm, a drone can only be in one swarm at any instant, communication routing between swarm drones can be by a fixed routing table, etc.

DETAILED DESCRIPTION

Figure 1:
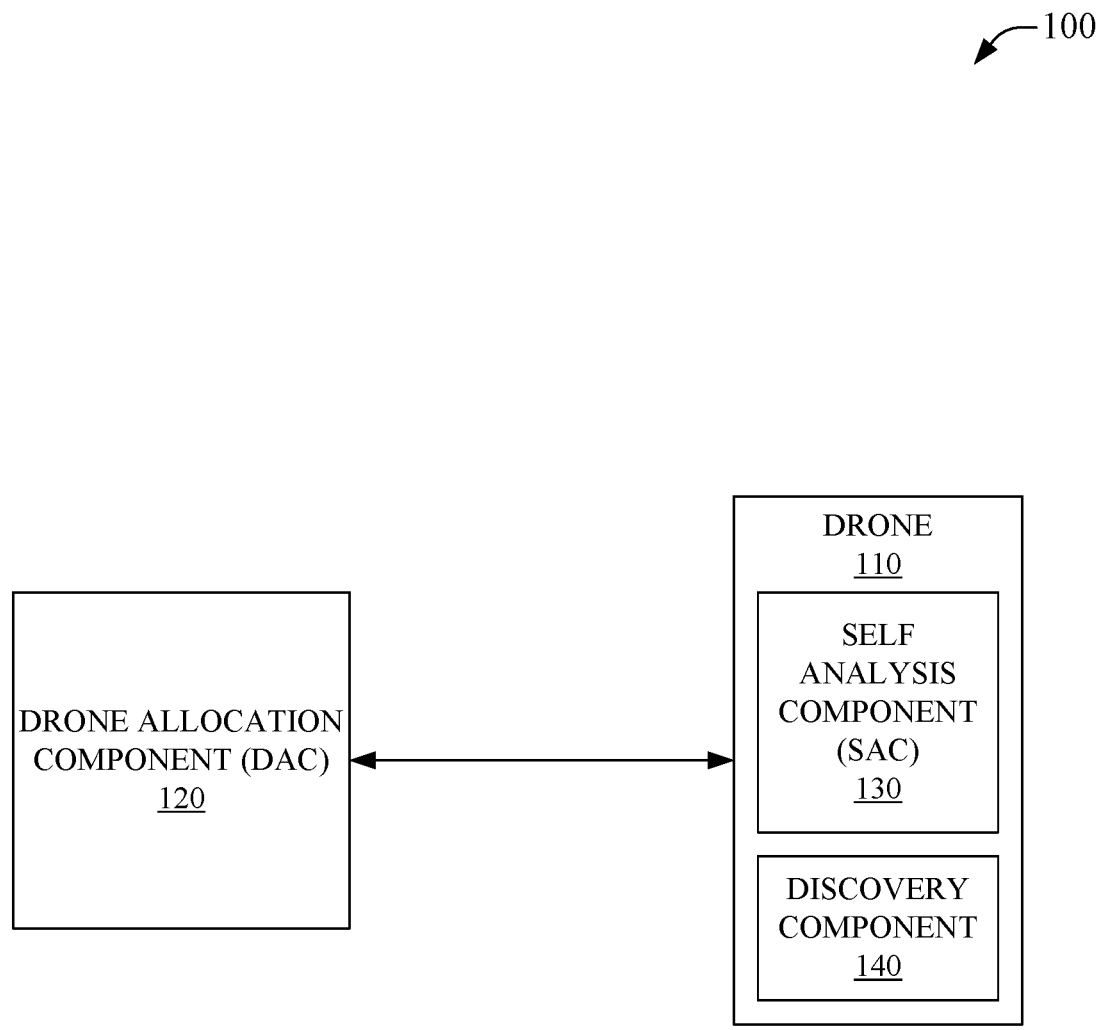
FIG. 1 is an illustration of an example system that facilitates multiple mesh drone communication in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional remotely controlled land, air, water, space vehicles, etc., hereinafter collectively referred to as drones, generally employ remote control operation and/or remote activation of vehicular self-control, in a generally closed system. The closed system can be expressed as ownership, e.g., a consumer can own a drone and operate the drone as their own, much as a car can be owned by a consumer and the car can be operated by the consumer. Multiple drones can operate as a group or constellation of drones, hereinafter collectively referred to as a drone mesh or similar term. A drone mesh conventionally is operated in a closed manner and under a single ownership, e.g., all drones in a drone mesh are owned by a single entity and drones owned by other entities are not typically admitted into the drone mesh. As an example, a drone mesh delivery system, such as operated by an online retailer, package delivery company, etc., can comprise only drones belonging to an operating entity, which can control the drone mesh, e.g., drones of the drone mesh, via a remote control device. As another example, a military drone mesh can comprise only military owned drones and be operated from a control center located remotely from the drone mesh for operation by designated military personnel, such as members of a drone pilot corps. Intelligent allocation of drone resources can also become increasingly significant where drones are becoming increasingly accessible to accomplish tasks. Further, as drones, for land, sea, air, and/or space operation, become increasingly ubiquitous, drones owned by other entities can have attributes that make said drones attractive for inclusion in a drone mesh, e.g., drone meshes comprising drones of different ownership can offer advantages over drone meshes comprising drones of single ownership. Moreover, communication between different drone meshes, both single owner drone meshes and multi-owner drone meshes, can provide advantages over a lone drone mesh. Intelligent interaction between drone resources can facilitate improved performance in real-world deployment(s).

The instant disclosure seeks, in an aspect, to facilitate drone communication in multiple mesh environments, e.g., environments having a plurality of drone meshes. Allocation of drone resources, in an intelligent and shared manner, generally in the absence of physical transfer of a remote controller device between users, can result in multi-owner drone meshes, which can be benefited by improved communication between drones of the one or more drone meshes and one or more drone owners. In an embodiment, remote provisioning of drone resources, e.g., allocating use of a drone to different sets of users, typically in a serial manner, can allow for improved access to drone resources. As an example, a first user can be allocated drone use via a drone allocation component for a first time period, and then a second user can be allocated use of the drone via the drone allocation component for a second time period. In this example, the first user and the second user can, but need not, own the drone. As such, they can accord use, or be accorded use, of the drone to accomplish or facilitate accomplishment of a task or mission. In an aspect, this can be similar to reserving use of a shared automobile, where the first and second users may, or may not, own the car, but are allowed to use the car according to an agreement between the car owner and the intended users. However, unlike the shared car example, the use of the drone can be abstracted further, for example, a user can designate a drone mission, generally intended to mean a set of operations or goals for the drone to achieve, from a remote device, which the drone can then execute based on rules related to when and how a drone is used in the context of shared drones. As an example, a group of aerial drones can be tasked with collecting traffic images. This group of drones, e.g., a drone mesh, can intercommunicate to accomplish the traffic imaging task, e.g., between drones of single ownership or multiple ownership. Further, the example drone mesh can have multiple tasks, often, but not always, associated with a plurality of users, for example, the drone mesh can also be tasked with capturing weather or environmental data, such as for a first owner of a drone of the drone mesh, in addition to traffic imaging that can be for a second owner of another drone of the drone mesh. Communication between the drones of the drone mesh can, for example facilitate capturing weather data in periods where imaging traffic is not being performed, to accomplish both tasks for the example multiply owned drones of the drone mesh.

In some embodiments of this disclosure, multiple drone meshes can facilitate communication between meshes, e.g., inter-mesh communication. This can be enabled by a drone as a member of one or more drone meshes, to enable participation in accomplishment of one or more tasks, and to enable provisioning of drones for use in the one or more drone meshes based on a status of a drone or drone mesh of the drone meshes and attributes of drones in the drone mesh(es), other available drones, etc. As an example, where a first drone and a second drone are in a first drone mesh, a third drone and a fourth drone are in a second drone mesh, and a fifth drone is available for use, this disclosure enables the drones of the first mesh to communicate with the drones of the second mesh, to add the fifth drone to the first or second mesh, to merge the first and second mesh, to remove a drone from either the first or second mesh, etc., based on the attributes of the first through fifth drone, the status of the first through fifth drone, in view of task(s) allocated to the first or second drone mesh, etc. As such, for example, where the first through fifth drones are marine drones and the task is to map dissolved $CO_2$ in a lake, where the lake is small, the task may be readily accomplished by the first drone mesh, however, where the lake is large, the task can be accomplished faster by sharing the task with the second drone mesh. Where the fourth drone lacks a $CO_2$ sensor, the present disclosure can facilitate adding the fifth drone to the second mesh, and sharing the $CO_2$ mapping task between the first drone mesh and the third and fifth drones of the second drone mesh. In an aspect, drone attributes, such as sensor capabilities, battery status, solar power status, operational envelopes of a drone, drone radio technology(ies), drone mesh membership(s), environment characteristic(s) of an environment(s) in which a drone is operating, etc. As an example, where the third drone is at 10% remaining battery life, the disclosed subject matter can facilitate adding the fifth drone to the second mesh to relieve the fourth drone, which can then, for example, return to a drone base to charge the depleted battery.

It will be noted that as drones become more pervasive and increasingly ubiquitous, multiple mesh drone communication can be effective for efficient distribution of drone resources. As an example, rather than every news channel in a region owning and operating a separate drone for capturing video of unfolding events, wherein the separate drones can be, to a large degree, redundant, fewer drones can be employed in a shared manner among the several news channels. The distribution of drones, e.g., in one or more drone meshes, can be based on sharing, lending, renting, auctioning, etc., drones among the tasks that are designated. In the above example, the news channels could participate in an auction, scheduling program, etc., to reserve a drone for a particular use and can also participate in shared use, such as several news channels each contributing to the cost of the drone monitoring a regional roadway during rush hour. As such, when the drone is not monitoring the regional roadway, the drone could be employed in alternate missions by other news channels, such as for aerial photography of a festival, monitoring of an evolving local news story, etc. As such, a drone can be shared, loaned, rented, leased, borrowed, auctioned, etc., for money, services, etc., e.g., a drone can be borrowed from a first mesh into a second mesh in exchange for a promise of money, credit, access to a good/service/data, reciprocity in lending a drone back to the first mesh, etc. Nearly any trade, exchange, lending library, etc., model can be employed in these aspects. In another example, even where a news channel does own a drone, use of that drone can be reserved for high priority uses, where more pedestrian uses can be allocated to rented drones that can be remotely provisioned, e.g., the regional traffic drone can provide traffic information to one or more news channels for exchange of monetary value so that another individually owned drone is unfettered and available for coverage of breaking news.

In effect, drones can become a more widely accessible resource when operating in one or more drone meshes that employ multiple mesh drone communication technology, such as is disclosed herein. Drones can take on a communal character, a rented or leased character, a gift character, a benefit character, etc. In an aspect, privately owned drones can be made available to others, e.g., be made publically available, such as to anyone, be made semi-publically available, such as to members of a group meeting determined criteria, be made shareable, such as to one or more specifically designated people, etc. Moreover, publically owned drone resources can be deployed, e.g., publically owned drone resources can be deployed for public use. Additionally, white-list and black-list filtering can be employed to include or exclude users, or users associated with determined characteristics, histories, uses, etc., to include or exclude drones in one or more meshes, etc.

Provisioning of the drone resource can include autonomous and/or semi-autonomous mission parameters. As an example, a drone can be remotely provisioned to monitor activity related to a curfew by driving a determined region in an autonomous manner. As another example, a drone can be remotely provisioned to arrive and remain proximate to a location in an autonomous manner where it can receive further instructions for operation from a user remote controller, such as via a smart phone touch interface, via a voice interface, via monitoring visual cues, such as hand signals, presented by a user or users, in the area of operation, etc. Expanding on the example, a game warden can request a drone mesh operate proximate to a wilderness area at a designated time, where the drones of the mesh can operate para-statically until they receive commands from a user, e.g., via a mobile device, etc., whereby the user can instruct the drone mesh to track an identified animal, providing video feedback to the user's mobile device. This can allow the game warden to view the tracked animal via the drones, wherein the drone mesh can keep the animal in view by orienting the constellation of drones to provide images to the warden as the animal passes between drones of the drone mesh, even when the warden does not have a sight line to the animal. In a similar example, a parent can request a drone mesh 'walk their child to school' in the morning, wherein the drones of the mesh can be provisioned to arrive and then track the child as they walk or ride a bike to school, providing images periodically unless the child departs from a determined route, wherein proximate drones of the mesh can capture video, audio, location information, an audible alarm, etc. This could allow a parent to see that their child is taking unsafe shortcuts on their way to school, could capture valuable video imagery, such as a license plate number, in the case of an abduction, etc. Moreover, drones regularly operate with sensors that provide improved capture of information, which could allow the drone mesh to capture audio from a scene, track a thermal image of the child through fog, rain, clouds, or darkness, etc., capturing RFIDs, SIM identifiers, etc., from devices proximate to the child, etc., which in an abduction situation could be immensely useful to law enforcement, such as getting a plate number of a van, video of the abduction even at night, and capturing the SIM identifier of a mobile device of the abductor contemporaneous with the abduction, all without the parent ever purchasing a drone, or physically renting and controlling the drones of the mesh in an active manner. Moreover, where the child transitions between zones affiliated with different drone meshes, inter-mesh communication can allow the continued monitoring of the child via different drone meshes. Multiple mesh drone communication can have a definitive impact on access to drone resources in a manner that can reduce the consumption of user resources.

In an aspect, multiple mesh drone communication can determine allocation of a drone according to parameters of a drone request. A drone mesh can then be provisioned in accord with the determined allocation. A request response can then be generated. As an example, a drone request can be employed to determine drone request information, which can be received by a drone allocation component. The drone allocation component can then determine drone-provisioning information based on the drone request information. The drone provisioning information can be employed to provision drones of one or more drone meshes and, in response, an acknowledgement that the drone is provisioned can be returned to the user via a generated response comprising request response information. In an embodiment, the drone allocation component can employ the drone request information to select appropriate drone(s) from a set of one or more drones for inclusion in the one or more drone meshes.

Selection can be based on parameters such as, but not limited to, a type of drone, a drone specification, an mission operating environment, drone availability, price, proximity, rules or laws, user profile, scheduling, a control interface or feature thereof, prior use of drones by the user, insurance features, intended use characteristics, certification, training, geographical or political boundaries, etc. As an example, parameters for remote provision of a drone mesh can be very different where the drones, in one case, are to be used to film a back yard birthday party for a user's 10 year old son, and in another case, are to be used to monitor surfing conditions in front of an incoming weather system for a large surfing competition. However, a drone allocation component can determine which, if any, drones in one or more drone meshes satisfy drone allocation parameters based on the drone request information.

It will be noted that the drone request information can be used to determine and/or infer values that can be employed in determining satisfaction of a drone allocation parameter, for example, the drone request information can comprise a designation that a drone of the drone mesh have video capability which can be used to filter out drones without video. Further, the drone request information can comprise requestor income information that can be used to infer drones in a probable cost/price range, allowing the drone allocation component to select one or more drone meshes that meet designated parameter(s) and are more likely to be 'affordable' to the requestor. It will be noted that many information vectors can be employed in inferring values that can be employed in determining satisfaction of a drone allocation parameter and that all such inferences are within the scope of the instant subject matter even where not explicitly disclosed for the sake of clarity and brevity. As another example, an inference can be made by the drone allocation component based on the requestor's usage history, drone operation certifications associated with the requestor, weather conditions, operational characteristics of one or more drones, etc., such that a drone mesh can be allocated that is most likely to be comfortably usable by the requestor, e.g., analogously it can be inferred that it would be less likely for a 90-year old man would like to rent a landscaping truck with manual steering and without a tilt-bed, and more likely to want to rent a compact truck with power steering and a dump-bed, even though both would be effective at delivering beauty bark to his home, even where the landscaping truck might be located closer and be available for the same cost.

In some embodiments, drone meshes can be tiered, e.g., hierarchically tiered. Tiers of drone meshes can be associated with different drone/mesh factors, for example, actual, anticipated, or estimated usage of drones or drone resources, ownership of drones or drone resources, organizational structures, regional proximities, etc. As an example, a first drone mesh, comprising one or more drones, can be associated with private drones made available to users other than the private owners, such as drones owned by one or more persons in a neighborhood being made available for provisioning to the general public, other members of the neighborhood but not the general public, to members of a club or determined group, etc. As such, where the private drones are made available to the public, then John Q. Public can request drones from this first drone mesh be tasked with a mission. Further, where a second drone mesh can be associated with a corporation, this second mesh can be designated as at another tier, for example, where a satisfactory drone from the first mesh cannot be found, the second mesh can be searched for an appropriate drone, which can then be shared between the two meshes, transferred from the second mesh to the first mesh, etc. This hierarchical tier scheme can enable drones in different tiers to be identified based on criteria associated with the distinction between the tiers. As an example, where a corporation has three tiers of drone meshes, the first tier can comprise older drones, the second tier can comprise newer drones that have already been amortized, and the third tier can comprise newer drones that have not yet been fully amortized. As such, request for a drone can first be searched against the first tier, then the second tier, then the third tier, wherein each tier can be associated with rules pertaining to the provisioning of a drone from that tier to a drone mesh. Thus, where a satisfactory first tier drone is found, it can be provisioned in lieu of another satisfactory drone from the second or third tier drone sets.

Of note, the present disclosure is different from, and an improvement over, current 'drone sharing' techniques that generally rely heavily on human interaction and are typically closed groups of drones. An example of a conventional drone rental technique involves an online reservation that can be made for a drone from a rental group, to which the renter must then travel to pick up the drone for use and must return it to after use. In contrast, the instant disclosure can provide for direct provisioning of an appropriate drone mesh such that the drones of the mesh arrive where/when needed and can operate in an autonomous or semi-autonomous mode, e.g., being at the desired location and then taking commands, receiving a mission package and executing the mission autonomously, etc. As an example of another conventional system, higher end drones can be 'rented' online, wherein the renter discusses a mission with a human operator and the human operator coordinates execution of the mission for the renter. These types of services can be, for example, associated with a corporate user requesting a drone service provider to deploy a group of drones for a mission over an oil field half a world away. The instant disclosure again differs from, and can be an improvement over, such technologies in that the drones of the mesh typically can be automatically provisioned to execute the mission half a world away without generally needing to interact with the human operator. Moreover, the mesh, via multiple mesh drone communication, can cycle in or out drones based on a status of the drones, can merge or dived a mesh to accommodate a mission or multiple contemporaneous missions, can create or retire submeshes based on parameters of a mission(s), can share or transfer missions among different drone meshes, etc. Of course, in some instances, especially where the mission is highly complex, inclusion of human operators or planners can be employed without departing from the scope of the present disclosure while still maintaining a differential improvement over those systems either in the reduction in human interaction over conventional systems, or for other reason elucidated herein. Multiple mesh drone communication is generally distinct from conventional techniques that treat a group of drones as a closed set and do not facilitate communication to other drone meshes or drones thereof. Further, the ability to provision from different drone meshes, and/or different tiers of drones, is substantially different from conventional technologies, more so in that, where drone meshes can comprise large numbers of drones, a drone allocation component can improve provisioning of an appropriate or satisfactory drone over conventional techniques. As an example, rather than having to manually select from a handful of drones via a website or with a human operator, the instant disclosure can enable searching across large numbers of drone in existing or creatable drone meshes based on parameters, characteristics, history, intended use, schedules, locations, interface features, a user profile, etc., in a manner that can be faster and more accurate than a manual search. This can facilitate efficient allocation of drones and associated resources, such that, for example, a drone can be provisioned from company B that is farther away, rather than company A that is closer, based on the drone from B just meeting the drone request parameters in contrast to the drone from A far exceeding the drone request parameters. Numerous other distinctions over conventional techniques are illustrated expressly or inherently herein, and are to be considered within the scope of the instant disclosure.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates multiple mesh drone communication in accordance with aspects of the subject disclosure. System 100 can include drone allocation component (DAC) 120 that can facilitate multiple mesh drone communication. DAC 120 can receive drone information about drone 110. Drone information can comprise a characteristic, attribute, status, etc., of drone 110 via self-analysis component (SAC) 130. Moreover, drone information can comprise information related to drones within a discovery volume of drone 110 via discovery component 140, e.g., where other drones are within a distance of drone 110, discover component 140 can communicate to DAC 120 information about the other drone. This aspect can allow drone 110 to relay information to DAC 120 about other proximate drones. As an example, where drone 110 is a self-driving vehicle, discovery component 140 can communicate information about other drones in a discovery volume related to drone 110. This information can include identifying the other drones, e.g., other self-driving vehicles, etc., relaying attributes or characteristics of other drones, relaying statuses of other drones, etc., that, for example, can be near the self-driving vehicle on the freeway, such as identifying a drone flying overhead, relaying attributes of other self-driving vehicles within 50 feet in front and 20 feet behind the self-driving vehicle, etc.

In an embodiment, DAC 120 can catalog information about drone 110 received via SAC 130. Further, DAC 120 can catalog information about drones discovered via discover component 140. The catalog can be updated by a plurality of drones from one or more drone meshes. As an example, drone 110 can determine via SAC 120 that drone 110 comprises an IR still camera, a Bluetooth controller, a location GPS system, a thermocouple, 85% remaining battery life, is operating in normal parameters, and can operate in winds up to 20 miles per hour, which information can be cataloged by DAC 120. Example drone 110 via discovery component 140, can determine that two other drones are proximate to drone 110, and can facilitate access to an identifier of each of the two drones as well as information relating to 10% battery life of one of the two drones, which information can be communicated to DAC 120. DAC 120 can enroll this information in a drone catalog. Moreover, DAC 120 can determine, based on the identifiers of the two proximate drones, characteristics of the other two drones from historical information related to the identifiers respectively. Further, the 10% remaining battery life of one of the two drones can be updated in the catalog and affiliated with a time stamp, such that where the drone is identified in other meshes near in time to the time stamp, an inference of low battery life can be made. In this example, where a drone mesh is tasked with a mission, DAC 120 can facilitate access to the cataloged information to enable selection of appropriate drones for the mission. Continuing the example, a drone mesh comprising example drone 110 can be formed, or drone 110 can be added to or shared with an existing drone mesh, where a mission designates an IR imaging device for completion of the mission. Moreover, where the mission parameters indicate an extended operational period, the example other drone with 10% battery life can be removed from the mesh, or not included in the formation of a mesh, based on the low level of remaining battery life not being conducive to the indicated extended operational period. Alternatively, the example 10% battery life drone can be included/added where other parameters of said example drone are not satisfied by other drones, thereafter, DAC 120 can, as the catalog is further updated, swap out the example 10% battery life drone for another drone meeting the other parameters and having more battery life available, e.g., the low batty drone can be used in a mesh until another suitable replacement can be provisioned, noting that the other suitable replacement can be discovered after the low battery life drone has been provisioned/employed.

In some embodiments, DAC 120 can orchestrate adaptation of a mesh in response to a changing parameter, status, environment, task/mission, etc. Continuing the prior example, where example drone 110 is incorporated into a mesh, where weather conditions indicate that average wind speeds are exceeding the 20 mile per hour operational envelope, a different drone can be provisioned to the mesh to accommodate the higher wind speeds, the mesh can discover other drones, via discover component 140, and communicate this information back to DAC 120, which can adapt the first mesh based on attributes, characteristics, statuses, of discovered drones, to accommodate the changed average wind speed, etc. Moreover, where drone 110 is a drone of a first mesh and discovers, via discovery component 140, another drone of a second mesh, drone 110 can communicate with the other drone to receive information about one or more drones of the second mesh, e.g., even where drone 110 is not in direct communication with said all the other drones of the other mesh, and can communicate the information about the drones of the second mesh to DAC 120 for cataloging. As such, DAC 120 can capture information about other drones/meshes via communication between drones of different meshes in an almost web-crawler type manner, e.g., information about the drones of the second drone mesh can be cataloged via a communication link between a drone of the first mesh in communication with a drone of the second mesh. Similarly, a drone of a third mesh can funnel information about drones of the third mesh to a drone of the second mesh, which can funnel the information about the drones of the third mesh to a drone of the first mesh, which can funnel the information about the drones of the third mesh to DAC 120 for cataloging even though there may be no direct communication between any drone of the first mesh and any drone of the third mesh except through a drone of the second mesh.

In some embodiments, DAC 120 can communicate with multiple drone meshes. As an example, DAC 120 can receive information from a first drone mesh, a second drone mesh, and a third drone mesh, e.g., via a communications link to one or more drones of the first, second, and third meshes. Moreover, DAC 120 can receive information about a fourth mesh via one or more of the first, second, or third meshes. Further, a plurality of DACs can source cataloged information among themselves and/or to a more centralized catalog, e.g., a regional or central drone catalog. In an example, where a fifth mesh is cataloged at a second DAC, DAC 120 can receive information about the fifth mesh via the other DAC, via a communication path between the fifth mesh, the fourth mesh, and one or more of the first, second, and third meshes, via a communication path between the fifth mesh and one or more of the first, second, or third meshes, etc. As such, DAC 120 can facilitate adapting, for example, the first mesh to include a drone of the fifth mesh, even where there may be no direct communication link between the drones of the first mesh and the drones of the fifth mesh prior to adapting the first mesh.

In an aspect, DAC 120 can be located local to or remote from drone 110. In some embodiments, DAC 120 can be comprised in an access point or network edge device, proximate to, and in communication with at least one drone of a drone mesh. In some embodiments, DAC 120 can be located more remote from the drone/mesh, e.g., at a network gateway, core-network component, etc., in communication with the drone/mesh via an edge device, e.g., an access point, radio access network device (RAN) such as a NodeB, eNodeB, etc. In some embodiments, DAC 120 can be comprised in drone 110. In some embodiments, DAC 120 can be a virtual component, e.g., operating as an instance on one or more networked computing devices, such as, one or more servers, in a cloud-computing environment, such as AMAZON WEB SERVICES (AWS), MICROSOFT AZURE, etc., or nearly any other virtualization environment that can receive information via a wireless connection with drone 110. Moreover, cataloged drone/mesh information can be stored locally or remotely from DAC 120. As an example, DAC 120 can be located regional network gateway and catalog information on a web server or other remote storage device. As a further example, DAC 120 can be comprised in a RAN device including a storage device for storing cataloged drone/mesh information, e.g., via SAC 130 and/or discovery component 140.

In an aspect, drone information can comprise an owner name, address, phone number, drone/owner identification information, drone/owner account information, drone/owner profile information, drone/owner certification information, drone/owner logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc., drone status, mesh status, etc. It will be noted that nearly any pertinent information about a drone, mesh, environment, drone characteristic, drone parameter, mission parameter, etc., can be included in drone information. Moreover, drone information can be originated by a first drone and can be supplemented with information from other drones, devices, meshes, etc. As an example, where a drone indicates an operation environment is within determined operational envelope parameters, this information can be supplemented by a weather data server indicating a fast approaching storm, by other drones nearer to the fast approaching storm indicating a changing environment advancing toward the drone, etc.

In some embodiments, drone information can comprise information that can be used to infer parameters, allowing DAC 120 to determine a drone/mesh that meets explicit and inferred parameters. It will be noted that nearly any information vector can be employed in inferring values that can be employed in determining satisfaction of a drone/mesh allocation parameter. As an example, an inference can be made by DAC 120 based on predicted weather that certain drone parameters are likely important. Where a drone/mesh request is made, for example, four months in advance of the mission date, the weather can be inferred initially for provisioning drones to the mesh, and additional drones or associated resources can be earmarked where the inference is weak due to the long lead up time to the mission. As such, the inference can be revisited as the example weather information changes as the mission date approaches such that the provisioning of the drone/mesh can be updated and remain correspondingly more relevant.

DAC 120 can determine drone selection parameters related to a mission parameter, mission goal, mission preference, etc. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone information cataloged by DAC 120. Further, selection parameters can be based on other information, for example, drone mesh information, drone information for drones comprising a drone mesh, other meshes or drones thereof, weather information, schedule information related to persons related to the mission event, etc. As an example, drone information can indicate both mom and dad will be at the little league game and direct mission operations via smartphones, this can trigger capture of the type of smartphone used by both mom and dad to be a parameter in selecting drones for a mesh that can interact with both types of phone. DAC 120 can determine what, if any, drone in one or more meshes satisfy drone allocation parameters based on drone information and other related information. Additionally, selection parameters can identify a drone, a drone mesh, multiple drone meshes, tiers of drones/meshes, etc. This information can be employed in determining, in conjunction with the selection information, a drone to provision in a mesh.

In some embodiments, drone mesh can self-organize and/or self-optimize (SOSO). SOSO can be based on cataloged information via DAC 120. As such, multiple mesh drone communication, can allow 'on the fly' adaptation of a mesh in response to changes in nearly any drone/mesh/mission characteristic or parameter. In an aspect, this can provide a level of redundancy on a mesh to accommodate unexpected events. As an example, where a drone mesh is tasked with keeping birds away from an airport runway, DAC 120 can facilitate adapting the mesh by providing catalog information to drones of the mesh, allowing them to integrate drones of another mesh, deploy or provision new drones from a drone base, etc., where a drone of the mesh indicates to the other drones of the mesh that is experiencing a failure, that a battery is running low, etc., or where a drone of the mesh suddenly becomes unavailable, e.g., due to a crash, part failure, etc. Moreover, SOSO behavior can enable adaptation of meshes in a highly automated manner. As an example, a first mesh and a second mesh can overlap spatially, such that SOSO can adapt one or more of the first or second mesh to operate more efficiently, such as by removing a redundant drone, adapting mesh membership of one or both meshes, splitting the two meshes into three meshes that have less overlap, etc.

Figure 2:
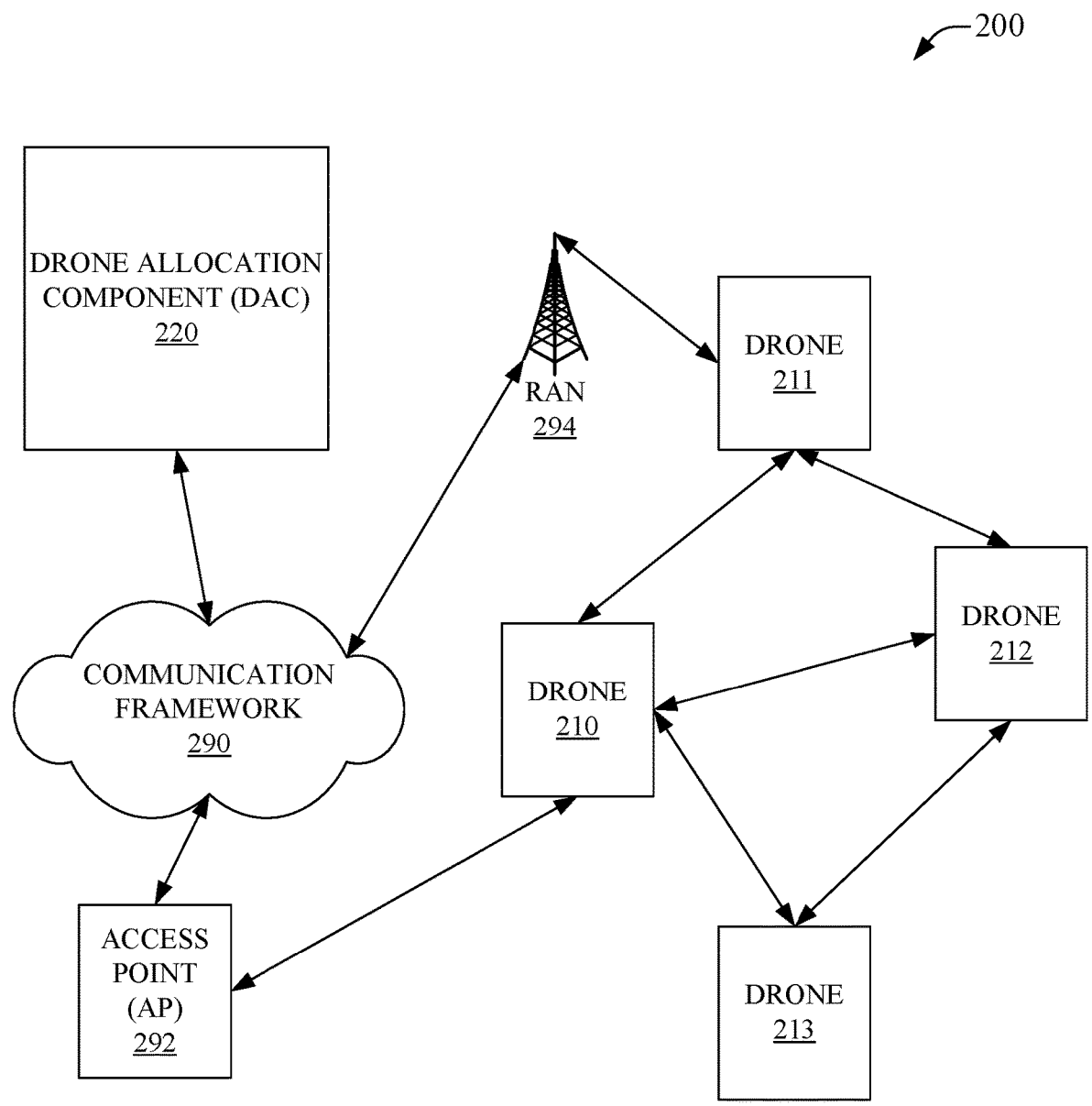
FIG. 2 is a depiction of an example system that facilitates multiple mesh drone communication via a remotely located drone allocation component in accordance with aspects of the subject disclosure.

FIG. 2 is a depiction of a system 200 that can facilitate multiple mesh drone communication via a remotely located drone allocation component in accordance with aspects of the subject disclosure. System 200 can include DAC 220 that can facilitate multiple mesh drone communication. DAC 220 can receive drone information about drone 210-213. Drone information can comprise a characteristic, attribute, status, etc., of drones 211-213 via a self-analysis component, as disclosed hereinabove. Moreover, drone information can comprise information related to drones within a discovery volume of drones 210-213 via a discovery component, also as disclosed herein, e.g., where other drones are within a distance of one of drones 210-213, the discover component can communicate to DAC 220 information about the other drone. This aspect can allow drones 210-213 to relay information to DAC 220 about other proximate drones. This information can include identifying the other drones, relaying attributes or characteristics of other drones, relaying statuses of other drones, etc.

In an aspect, DAC 220 can receive drone information via a communication framework 290. For example, communication framework 290 can communicate drone information from drone 210, via AP 292, to DAC 220. In another example, communication framework 290 can communicate drone information from drone 211, via RAN device 292, to DAC 220. In an aspect, drone 210 and drone 211 can represent drone mesh edge devices that are proximate to AP 292 and RAN device 294 correspondingly. Drone information from drone 212 and drone 213 can be communicated via the drone mesh comprising drone 210-213, to DAC 290 via one or more communication paths comprising an edge device, e.g., drone 210, 211, etc., AP 292 or RAN 294, and communication framework 290. In some embodiments, DAC 220 can be comprised in AP 292 or RAN device 294 such that communication framework 290 is not disposed between DAC 220 and AP 292 or RAN device 294.

In an embodiment, DAC 220 can catalog information about drones 210-213 and catalog information about other drones discovered via discover component(s) of one or more of drones 210-213. In an aspect, the catalog can be updated by a plurality of drones, e.g., drones 210-213, etc., from one or more drone meshes. As an example, drone 210 can determine that drone 210 comprises an video capture device, which information can be cataloged by DAC 220. Drone 210 of this example, can also determine that three other drones, e.g., drones 211-213, are proximate to drone 210, and can facilitate access to an identifier of each of the two drones as well as information relating to a characteristic, attribute, status, etc., of one or more of said proximate drones discovered, which information can be cataloged by DAC 220. DAC 220 can store this information in a drone catalog or other database relating to drone meshes. Moreover, where DAC 220 receives identifiers of the three proximate drones, e.g., 211-213, characteristics of the other three drones can be retrieved from historical information related to the identifiers of those three drones, e.g., where drones 211-213 are already cataloged, the identifier(s) relayed by drone 210 can be used to affiliate the historical drone profile for each of drone(s) 211-213 with the current state of the catalog and, where drones 210-213 are a mesh, the historical drone profiles for 211-213 can be affiliated with the mesh comprising drone 210. Where drone information communicated to DAC 220 via drone 210 is more recent than the historical drone profile data, the more recent data can be employed to update the catalog and the corresponding drone profile. As an example, where drone 212 has a historical profile showing a last software update of drone 212 as six months ago, and the discovery component of drone 210 conveys drone information to DAC 220 that drone 212 is indicating a recent software update, the recent software update can be placed in the drone profile of drone 212, e.g., the drone profile associated with the identity of drone 212 communicated to DAC 220 via drone 210, and the updated software can be correspondingly cataloged for any mesh affiliated with drone 212. As such, adaptation of a mesh comprising, or soon to comprise, drone 212 can be based on the more recent software update, such as where the recent software update supports a particular data encoding scheme that was not supported in the previous software update, this attribute can be employed in determining if drone 212 should be included in a particular mesh, for example where a mission designates support of the data encoding scheme.

In some embodiments, DAC 220 can communication with a mesh comprising drones 210-213 can occur via multiple communication pathways, e.g., via drone 210, via drone 211, or via both drone 210 and drone 211. This can provide a degree of robustness to communication between DAC 220 and said mesh, e.g., if drone 210 or drone 211 fails, communication to the mesh can occur through the other pathway. Moreover, distribution of data communication can occur across the plurality of communication pathways, e.g., providing higher data throughput, more bandwidth, etc., by employing multiple pathways for information, wherein the information can be the same or different information. As an example, drone information can be collected by DAC 220 via the pathway through drone 210 for the mesh comprising drone 210-213 and cataloged information can be accessed by the mesh from DAC 220 via the pathway comprising drone 211.

In some embodiments, DAC 220 can facilitate and/or orchestrate adaptation of a mesh in response to a changing parameter, status, environment, task/mission, etc. As an example, where drone 210 is incorporated into a mesh comprising drones 210-212, a different drone, e.g., drone 213, can be provisioned to the mesh based on cataloged drone information indicating drone 213 comprises a feature or attribute beneficial to a mission of the drone mesh, e.g., the drone mesh can be adapted to include drone 213. In an aspect, drone 213 can be included only in the mesh comprising drone 210-213, in the mesh comprising drone 210-213 and in one or more other meshes, shared with the mesh comprising drone 210-212, or can be requested to perform an action on behalf of the mesh comprising drone 210-212 without being shared or conscripted, etc.

In some embodiments, DAC 220 can communicate with multiple drone meshes. As an example, DAC 220 can receive information from a first drone mesh comprising drone 210 and drone 213, a second drone mesh comprising drone 211 and drone 212, and other drone meshes (see FIG. 4, etc.), e.g., via a communications link to one or more drones of the first (e.g., 210), second (e.g., 211), and third meshes. Moreover, DAC 220 can receive information about a fourth mesh via one or more of the first, second, or third meshes. Further, a plurality of DACs can communicate cataloged information among themselves and/or to a more centralized catalog, e.g., a regional or central drone catalog. In an example, where a fifth mesh is cataloged at a second DAC, DAC 220 can receive information about the fifth mesh from the other DAC via communication framework 290, via a communication path between the fifth mesh and one or more of the first, second, and third meshes with, or without, intervening meshes, etc. As such, DAC 220 can facilitate adaptation of, for example, the first mesh to include a drone of the fifth mesh, even where there may be no direct communication link between the drones of the first mesh and the drones of the fifth mesh prior to adapting the first mesh to include a drone of the fifth mesh.

DAC 220 can determine drone selection parameters related to a mission parameter, mission goal, mission preference, etc. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone information cataloged by DAC 220. Further, selection parameters can be based on other information, for example, drone mesh information, drone information for drones comprising a drone mesh, other meshes or drones thereof, weather information, schedule information related to persons related to the mission event, etc. As an example, drone information can indicate operation in a tropical storm environment, this can trigger capture of weather information for a targeted region to aid in selecting drones for a mesh that can operate in the expected conditions of a tropical storm in that environ. DAC 220 can determine what, if any, drone in one or more meshes satisfy drone allocation parameters based on drone information and other related information. Additionally, selection parameters can identify a drone, a drone mesh, multiple drone meshes, tiers of drones/meshes, etc. This information can be employed in determining, in conjunction with the selection information, a drone to provision in a mesh.

In some embodiments, a drone mesh, e.g., comprising drones 210-213, can self-organize and/or self-optimize (SOSO). SOSO can be based on cataloged information via DAC 220. As such, multiple mesh drone communication, can allow dynamic adaptation of a mesh in response to changes in nearly any drone/mesh/mission characteristic or parameter. In an aspect, this can provide a level of redundancy on a mesh to accommodate unexpected events. As an example, where a drone mesh comprising drone 210, 211, and 212, is tasked with package delivery, DAC 220 can facilitate adapting the mesh by providing catalog information to drones of the mesh, allowing them to integrate drones of another mesh, deploy or provision new drones from a drone base, etc., where a drone of the mesh indicates to the other drones of the mesh that it is experiencing a failure, that a battery is running low, etc., or where a drone of the mesh suddenly becomes unavailable, e.g., due to a crash, part failure, etc. Thus, in the example, where drone 212 is failing, or has failed, drone 213 can be added to the mesh, even where the drone is also part of another mesh, to facilitate completion of the mission. Moreover, SOSO behavior can enable adaptation of meshes in a highly automated manner. As an example, a mesh can comprise drones 210-213 to provide wireless network coverage to a an event in an area lacking sufficient wireless coverage, e.g., drone 211 can act as a bridge device to allow wireless links through 210, 212, and 213 to be routed through drone 211 to RAN device 294 where, for example, RAN device 294 might not otherwise provide adequate coverage to the area covered by drones 210-213. Where, in the example, drones 210 and 212 provide sufficient coverage to wireless links also covered by drone 213, SOSO techniques can adapt the mesh by releasing drone 213 from the mesh, instructing drone 213 to change positions to reduce coverage overlap, etc.

Figure 3:
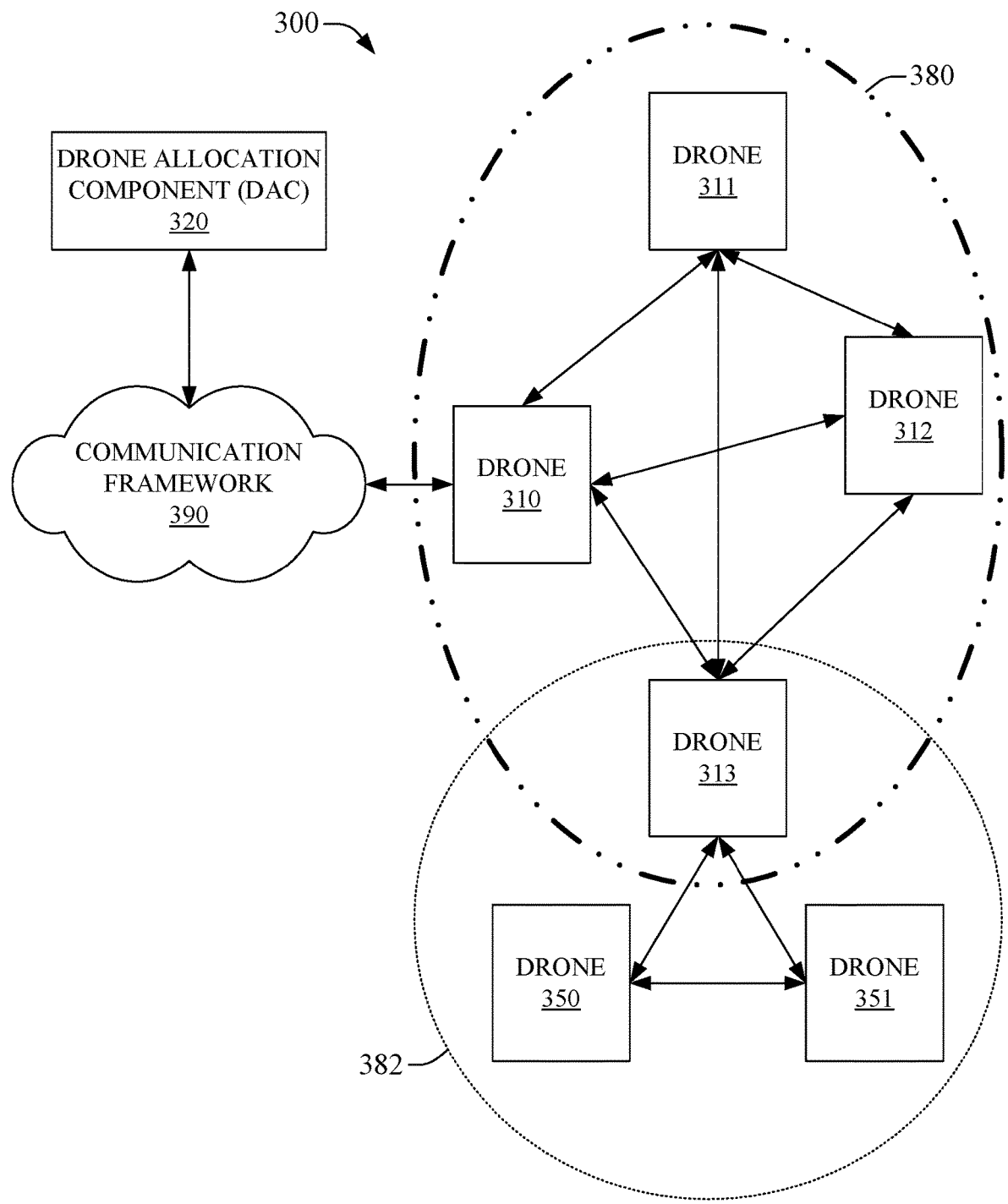
FIG. 3 illustrates an example system that facilitates multiple mesh drone communication via a drone committed to a plurality of drone meshes in accordance with aspects of the subject disclosure.

FIG. 3 illustrates a system 300 that facilitates multiple mesh drone communication via a drone committed to a plurality of drone meshes in accordance with aspects of the subject disclosure. System 300 can include DAC 320 that can facilitate multiple mesh drone communication. DAC 320 can receive drone information about drones 310-313 and 350-351. Drone information can comprise a characteristic, attribute, status, etc., of drones 311-313 and 350-351 via a self-analysis component, as disclosed hereinabove. Moreover, drone information can comprise information related to drones within a discovery volume of drones 310-313 and 350-351 via a discovery component, also as disclosed herein, e.g., where other drones are within a distance of one of drones 310-313 or and 350-351, the discover component can communicate to DAC 320 information about the other drone. This aspect can allow drones 310-313 and 350-351 to relay information to DAC 320 about other proximate drones. This information can include identifying the other drones, relaying attributes or characteristics of other drones, relaying statuses of other drones, etc.

In an aspect, DAC 320 can receive drone information via a communication framework 390. In an aspect, drone 310 and drone 313 can represent drone mesh edge devices. Drone information from drone 310-313 can be communicated via drone mesh 380 via one or more communication path comprising an edge device, e.g., drone 310 and communication framework 390. Drone information from drone 310-313 can be communicated via drone mesh 382 via one or more communication path comprising an edge device, e.g., drone 313, drone 310, and communication framework 390. As such, mesh 382 can communicate with mesh 380 and with DAC 320, mesh 380 can communicate with mesh 382 and with DAC 320, etc.

In an embodiment, DAC 320 can catalog information about drones 310-313 and 350-351, and catalog information about other drones discovered via discover component(s) of one or more of drones. In an aspect, the catalog can be updated by a plurality of drones, e.g., drones 310-313 and 350-351, etc., from one or more drone meshes, e.g., 380-382. As an example, drone 312 can determine, via drone 313, that drone 350 comprises a sensor device, which information can be cataloged by DAC 320. Drone 312 of this example, can also determine that other drones, e.g., drones 350-351, are proximate to drone 313, and can facilitate access to an identifier of each of the two drones as well as information relating to a characteristic, attribute, status, etc., of one or more of said proximate drones discovered, which information can be cataloged by DAC 320. DAC 320 can store this information in a drone catalog or other database relating to drone meshes. Moreover, where DAC 320 receives identifiers of the proximate drones, e.g., 350-351, characteristics of the other drones can be retrieved from historical information related to the identifiers of those three drones, e.g., where drone 350 is already cataloged, the identifier(s) relayed by drone 312 via 310, can be used to access the historical drone profile of drone 350, for example indicating that drone 350 comprises the sensor device in the current example. Where drone information about drone 350 communicated to DAC 320 via drone 313, 312, and 310, is more recent than the historical drone profile data, the more recent data can be employed to update the catalog and the corresponding drone profile. As an example, where drone 350 has a historical profile showing the sensor but the current drone status indicates the sensor is not present on drone 350, this information can be employed to update the drone profile of drone 350, e.g., indicating no sensor device. As such, adaptation of a mesh comprising, or soon to comprise, drone 350 can be based on the lack of the sensor device, where this attribute can be employed in determining if drone 350 should be included in a particular mesh.

In some embodiments, DAC 320 can communication with a mesh, e.g., 380-382, via multiple communication pathways. This can provide a degree of robustness to communication between DAC 320 and a mesh. Moreover, distribution of data communication can occur across the plurality of communication pathways by employing multiple pathways for information, wherein the information can be the same or different information.

System 300 illustrates drone 313 as part of both mesh 380 and mesh 382. As such, drone 313 can support a mission associated with mesh 380 and a mission associated with mesh 382. This multiple mission support can occur concurrently, for example, where drone 313 participates in a temperature mapping mission of mesh 380 and concurrently participates in capturing audio in support of a second mission of mesh 382. Moreover, drone 313 can, for example, map temperatures in periods where audio is not being captured, e.g., idle time from the mesh 382 mission can be allocated to the mission of mesh 380.

In some embodiments, DAC 320 can facilitate and/or orchestrate adaptation of a mesh in response to a changing parameter, status, environment, task/mission, etc. As an example, mesh 380 can comprise drones 310-313, and a different drone, e.g., drone 350, can be provisioned to the mesh based on cataloged drone information indicating drone 350 comprises a feature or attribute beneficial to a mission of drone mesh 380, e.g., drone mesh 380 can be adapted to include drone 350. In an aspect, drone 350 can be removed from mesh 382 and included only in mesh 380, drone 350 can be included in both mesh 380 and mesh 382, can be requested to perform an action on behalf of mesh 380 without being conscripted into mesh 380, etc.

In some embodiments, DAC 320 can communicate with multiple drone meshes. As an example, DAC 320 can receive information from drone mesh 380 via drone 310, from drone mesh 382 via drone 313 and 310, etc. Moreover, DAC 320 can receive information about a another mesh via one or more drones of mesh 380, 382, etc. Further, a plurality of DACs can communicate cataloged information among themselves and/or to a more centralized catalog, e.g., a regional or central drone catalog. In an example, where a fifth mesh is cataloged at a second DAC, DAC 320 can receive information about the fifth mesh from the other DAC via communication framework 390 (not illustrated), via a communication path between the fifth mesh and one or more of meshes 380-382 inclusive of any intervening meshes, etc. As such, DAC 320 can facilitate adaptation of, for example, mesh 380 to include a drone of the fifth mesh, even where there may be no direct communication link between the drones of mesh 380 and the drones of the fifth mesh prior to adapting mesh 380 to include a drone of the fifth mesh.

DAC 320 can determine drone selection parameters related to a mission parameter, mission goal, mission preference, etc. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone information cataloged by DAC 320. Further, selection parameters can be based on other information, for example, drone mesh information, drone information for drones comprising a drone mesh, other meshes or drones thereof, weather information, schedule information related to persons related to the mission event, etc. As an example, drone information can indicate operation in a tropical storm environment, this can trigger capture of weather information for a targeted region to aid in selecting drones for a mesh that can operate in the expected conditions of a tropical storm in that environ. DAC 320 can determine what, if any, drone in one or more meshes satisfy drone allocation parameters based on drone information and other related information. Additionally, selection parameters can identify a drone, a drone mesh, multiple drone meshes, tiers of drones/meshes, etc. This information can be employed in determining, in conjunction with the selection information, a drone to provision in a mesh.

In some embodiments, a drone mesh, e.g., 380-382, etc., can self-organize and/or self-optimize (SOSO). SOSO can be based on cataloged information via DAC 320. As such, multiple mesh drone communication, can allow dynamic adaptation of a mesh in response to changes in nearly any drone/mesh/mission characteristic or parameter. In an aspect, this can provide a level of redundancy on a mesh to accommodate unexpected events. As an example, where drone mesh 380 is tasked with detecting forest fires due to lightning strikes, DAC 320 can facilitate adapting the mesh by providing catalog information to drones of mesh 380, allowing them to integrate drones of another mesh, e.g., mesh 382, etc., deploy or provision new drones from a drone base, etc., where a drone of mesh 380 indicates to the other drones of mesh 380 that it is experiencing a failure, that a battery is running low, etc., or where a drone of mesh 380 suddenly becomes unavailable, e.g., due to a crash, part failure, etc. Thus, in the example, where drone 312 is failing, or has failed, drone 350 can be added to mesh 380, even where the drone is also part of another mesh, e.g., mesh 382, to facilitate completion of the forest fire detection mission. Moreover, SOSO behavior can enable adaptation of meshes in a highly automated manner. As an example, mesh 380 can release drone 350 from mesh 380 where drone 312 is no longer failing.

Figure 4:
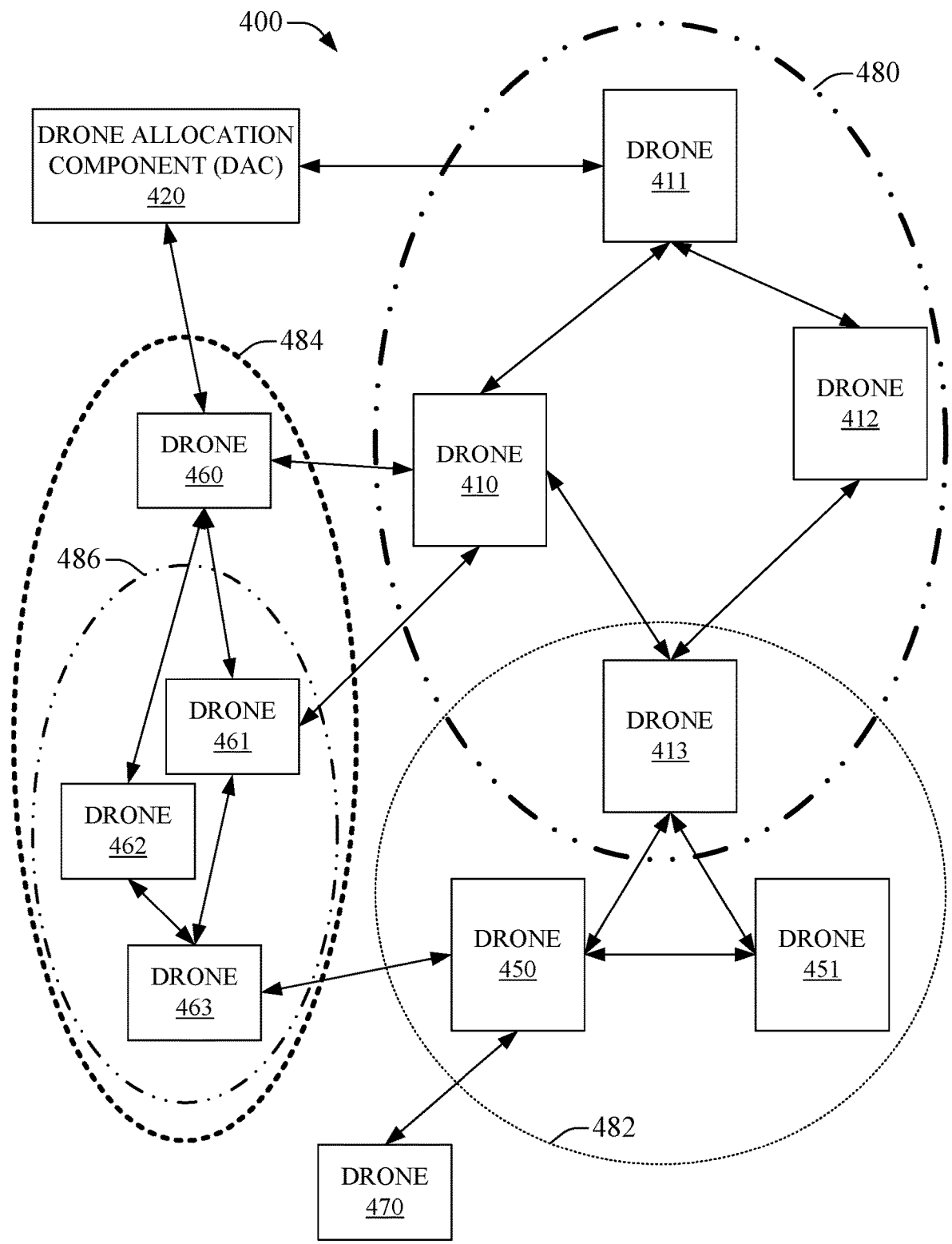
FIG. 4 illustrates an example system that facilitates multiple mesh drone communication via a plurality of example drone mesh topographies in accordance with aspects of the subject disclosure.

FIG. 4 illustrates a system 400 that facilitates multiple mesh drone communication via a plurality of example drone mesh topographies in accordance with aspects of the subject disclosure. System 400 can include DAC 420 that can facilitate multiple mesh drone communication. DAC 420 can receive drone information about drones, e.g., 410-413, 450-451, 460-463, 470, etc. Drone information can comprise a characteristic, attribute, status, etc., via a self-analysis component, as disclosed hereinabove. Moreover, drone information can comprise information related to drones within a discovery volume of other drones via a discovery component, also as disclosed herein, e.g., where other drones are within a distance of a first drones, the discover component of the first drone can communicate to DAC 420 information about the other drone. This aspect can allow drones to relay information to DAC 420 about other proximate drones. This information can include identifying the other drones, relaying attributes or characteristics of other drones, relaying statuses of other drones, etc.

In an aspect, DAC 420 can receive drone information via a drone of a mesh, e.g., via drone 411 of mesh 480, via drone 460 of mesh 484, etc., or via intervening drones of the same mesh or other meshes, e.g., drone information about drone 470 can be received via drone 450, 463, 461, 460, or via drone 450, 413, 410, 460, or via drone 450, 413, 412, 411, or via another pathway traversing one or more meshes, e.g., mesh 480, 482, 484, 486, etc.

In an embodiment, DAC 420 can catalog information about drones and catalog information about other drones discovered via discover component(s) of one or more drones. This cataloging of information about drones linked via other drones, either in one mesh or in a plurality of meshes, can be termed 'drone node crawling' and can be viewed as analogous to web link crawling. In an aspect, the catalog can be updated by a plurality of drones, e.g., drones 410-470, from one or more drone meshes, e.g., 480-486. DAC 420 can store this information in a drone catalog or other database relating to drone meshes. Moreover, where DAC 420 receives identifiers of drones proximate to other drones, e.g., drone 470 can be proximate to drone 450, characteristics of the other drones, e.g., 470, can be retrieved from historical information related to the identifiers of those three drones, e.g., where drone 470 is already cataloged, the identifier for drone 470 relayed by drone 450 and intervening drones to DAC 420, can be used to access the historical drone profile of drone 470. Where drone information about drone 470 communicated to DAC 420 via drone 450 and intervening drones, is more recent than the historical drone profile data for drone 470, the more recent data can be employed to update the catalog and the corresponding drone profile. As an example, where drone 470 has a historical profile showing a one ton lift capacity, the sensor but the current drone status indicates the drone 470 can lift two tons, this information can be employed to update the drone profile of drone 470, e.g., updated to indicate a two ton lift capacity. As such, adaptation of a mesh comprising, or soon to comprise, drone 470 can be based on the two ton lift capacity of drone 470 rather than the historical one ton lift capacity.

In some embodiments, DAC 420 can communicate with a mesh, e.g., 480-486, via multiple communication pathways. This can provide a degree of robustness to communication between DAC 420 and a mesh. As an example, communication to drones of mesh 482 can be via communications pathways via mesh 480, via meshes 484 and 486, or via meshes 480, 484, and 486. Moreover, distribution of data communications can occur across the plurality of communication pathways by employing multiple pathways for information transfer, wherein the information can be the same or different information, as disclosed hereinabove.

System 400 illustrates drone 413 as part of both mesh 480 and mesh 482. As such, drone 413 can support a mission associated with mesh 480 and a mission associated with mesh 482. This multiple mission support can occur concurrently. System 400 further illustrates that mesh 486 can be a submesh of mesh 484, which can again support multiple missions concurrently.

In some embodiments, DAC 420 can facilitate and/or orchestrate adaptation of a mesh in response to a changing parameter, status, environment, task/mission, etc. As an example, mesh 486 can be formed from drones of mesh 484 where a submesh of drones 461-463 is determined to be needed and the cataloged drone information for 461-463 indicates that these drones are capable and appropriate. In an aspect, appropriateness can include compositional considerations, e.g., drone 463 can be less powerful than drone 411, but drone 463 can still be selected due to geographical placement, remaining power levels, transit time, etc.

In some embodiments, DAC 420 can communicate with multiple drone meshes, e.g., meshes 480-486, etc. As an example, DAC 420 can receive information from drone mesh 480 via drone 411, from drone mesh 482 via drone 413, 410, and 411, etc. Moreover, DAC 420 can receive information about another mesh, e.g., mesh 486, via one or more drones of mesh 484, etc. Further, a plurality of DACs can communicate cataloged information among themselves and/or to a more centralized catalog, e.g., a regional or central drone catalog. In an example, where mesh 486 is cataloged at a second DAC, DAC 420 can receive information about mesh 486 from the other DAC via communication framework 490 (not illustrated), via a communication path between mesh 486 and one or more of meshes 484, 482, and/or 480, etc. As such, DAC 420 can facilitate adaptation of, for example, mesh 480 to include a drone of mesh 486.

DAC 420 can determine drone selection parameters related to a mission parameter, mission goal, mission preference, etc. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone information cataloged by DAC 420. Further, selection parameters can be based on other information, for example, drone mesh information, drone information for drones comprising a drone mesh, other meshes or drones thereof, weather information, schedule information related to persons related to the mission event, etc. As an example, drone information can indicate operation in a tropical storm environment, this can trigger capture of weather information for a targeted region to aid in selecting drones for a mesh that can operate in the expected conditions of a tropical storm in that environ. DAC 420 can determine what, if any, drone in one or more meshes satisfy drone allocation parameters based on drone information and other related information. Additionally, selection parameters can identify a drone, a drone mesh, multiple drone meshes, tiers of drones/meshes, etc. This information can be employed in determining, in conjunction with the selection information, a drone to provision in a mesh.

In some embodiments, a drone mesh, e.g., 480-486, etc., can self-organize and/or self-optimize (SOSO). SOSO can be based on cataloged information via DAC 420. As such, multiple mesh drone communication, can allow dynamic adaptation of a mesh in response to changes in nearly any drone/mesh/mission characteristic or parameter. In an aspect, this can provide a level of redundancy on a mesh to accommodate unexpected events. As an example, where drone mesh 480 is tasked with collection of orbiting debris, DAC 420 can facilitate adapting the mesh by providing catalog information to drones of mesh 480, allowing them to integrate drones of another mesh, e.g., mesh 482, etc., deploy or provision new drones from a drone base, etc., where a drone of mesh 480 indicates to the other drones of mesh 480 that a particular piece of debris is too large to capture alone. Thus, in the example, where a drone, e.g., 413, signals that assistance is needed, drone 450 and 451 can be added to mesh 480, even where they remain part of another mesh, e.g., mesh 482, to facilitate advancing the space junk collection mission. Moreover, SOSO behavior can enable adaptation of meshes in a highly automated manner. As an example, mesh 480 can release drones 450 and/or 451 from mesh 480 after the need for assistance has abated.

Figure 5:
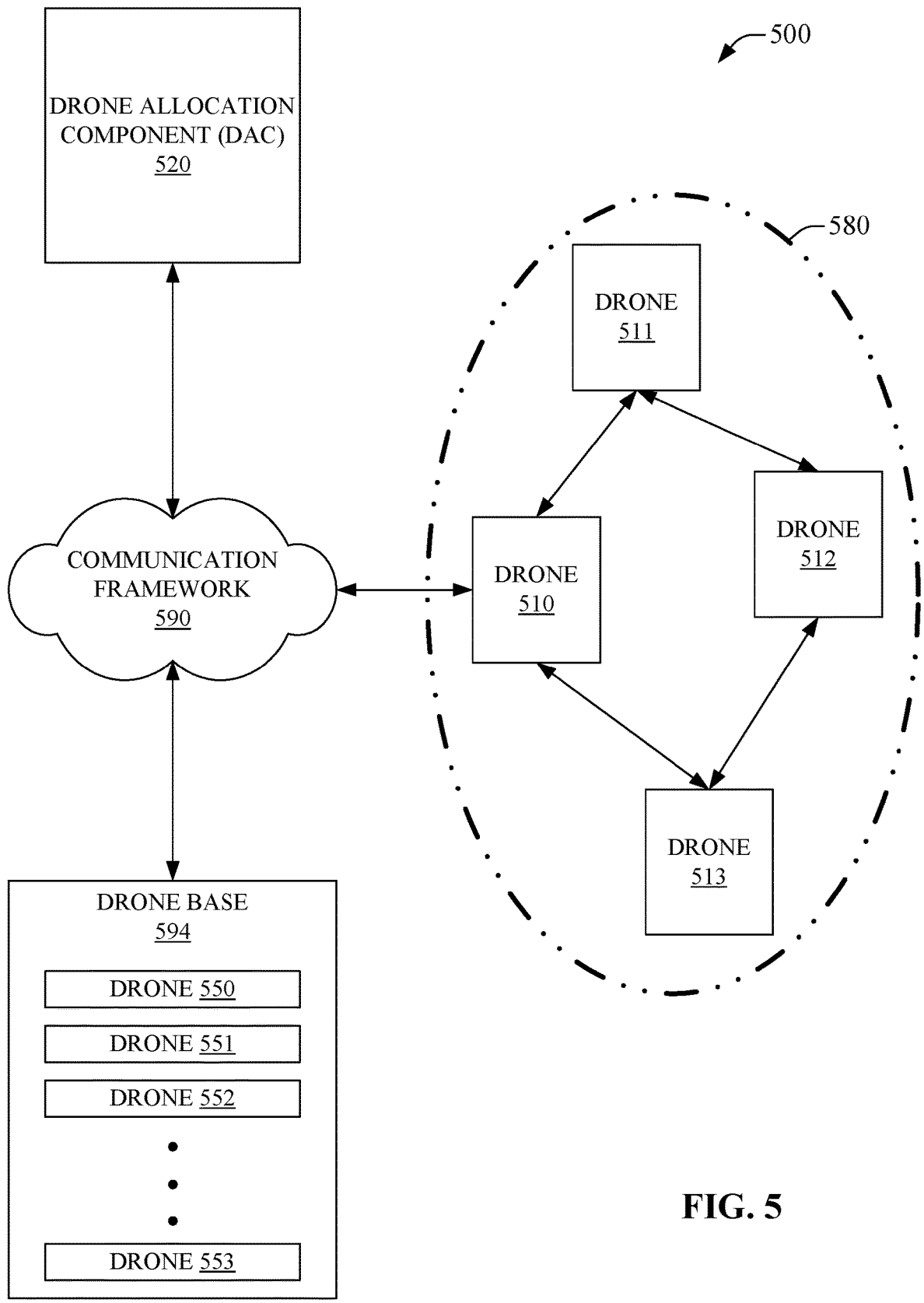
FIG. 5 illustrates an example system facilitating multiple mesh drone communication and provisioning of drone resources in accordance with aspects of the subject disclosure.

FIG. 5 illustrates a system 500 that facilitates multiple mesh drone communication and provisioning of drone resources in accordance with aspects of the subject disclosure. System 500 can include DAC 520 that can facilitate multiple mesh drone communication. DAC 520 can receive drone information about drone 510-513. Drone information can comprise a characteristic, attribute, status, etc., of drones 510-513 via a self-analysis component, as disclosed hereinabove. Moreover, drone information can comprise information related to drones within a discovery volume of drones 510-513 via a discovery component, also as disclosed herein, e.g., where other drones are within a distance of one of drones 510-513, the discover component can communicate to DAC 520 information about the other drone. This aspect can allow drones 510-513 to relay information to DAC 520 about other proximate drones. This information can include identifying the other drones, relaying attributes or characteristics of other drones, relaying statuses of other drones, etc. In an aspect, DAC 520 can receive drone information via a communication framework 590. For example, communication framework 590 can communicate drone information from drone 510 to DAC 520.

In an embodiment, DAC 520 can catalog information about drones 510-513 and catalog information about other drones discovered via discover component(s) of one or more of drones 510-513. In an aspect, the catalog can be updated by a plurality of drones, e.g., drones 510-513, etc., from one or more drone meshes. DAC 520 can store this information in a drone catalog or other database relating to drone meshes. Moreover, where DAC 520 receives identifiers of proximate drones, characteristics of the proximate drones can be retrieved from historical information related to the identifiers of those three drones, e.g., where the proximate drones are already cataloged, the identifier(s) relayed by a drone of mesh 580 can be used to affiliate the historical drone profile of each proximate drone. Where drone information communicated to DAC 520 via mesh 580 is more recent than the historical drone profile data, the more recent data can be employed to update the catalog and the corresponding drone profile. As such, adaptation of a mesh comprising, or soon to comprise, a proximate drone can be based on up to date information.

In some embodiments, DAC 520 can facilitate and/or orchestrate adaptation of a mesh in response to a changing parameter, status, environment, task/mission, etc. As an example, where drone 510 is part of mesh 580, a different drone, e.g., drone 550, 551, 552, . . . , 553, etc., can be provisioned to the mesh based on cataloged drone information indicating drone 550, 551, 552, . . . , 553, etc., comprises a feature or attribute beneficial to a mission of drone mesh 580, e.g., the drone mesh can be adapted to include drone 550, 551, 552, . . . , 553, etc. Drones 550, 551, 552, . . . , 553, etc., can be deployed from drone base 594. In an aspect, drone base 594 can house and deploy one or more drones, e.g., 550, 551, 552, . . . , 553, etc., in response to a request for a drone received via communication framework 590. Drone base 594 can be operated, for example, by a drone lending, leasing, or rental entity; as a part of an delivery company, a transportation company, a school or university, a retail entity, etc.; as part of an enthusiast or hobbyist group, etc., or as part of nearly any entity that can provide access to a drone device. In an aspect, drone 550, 551, 552, . . . , 553, etc., can be included only in mesh 580, in the mesh 580 and in one or more other meshes, shared with mesh 580, can be requested to perform an action on behalf of mesh 580 without being shared or conscripted into mesh 580, etc. As an example, a postal service drone can be added to a non-postal service mesh to aid in locating a child as part of an Amber alert response.

DAC 520 can determine drone selection parameters related to a mission parameter, mission goal, mission preference, etc. Selection parameters can include, but are not limited to, a type of drone, a drone specification, a mission operating environment, drone availability, price, proximity, rules or laws, user profile, scheduling, a control interface or feature thereof, prior use of drones by the user, insurance features, intended use characteristics, certification, training, geographical or political boundaries, etc. Selection parameters can be based on drone information cataloged by DAC 520. Further, selection parameters can be based on other information, for example, drone mesh information, drone information for drones comprising a drone mesh, other meshes or drones thereof, weather information, schedule information related to persons related to the mission event, etc. As an example, drone information can indicate operation in a tropical storm environment, this can trigger capture of weather information for a targeted region to aid in selecting drones for a mesh that can operate in the expected conditions of a tropical storm in that environ. DAC 520 can determine what, if any, drone in one or more meshes satisfy drone allocation parameters based on drone information and other related information. Additionally, selection parameters can identify a drone, a drone mesh, multiple drone meshes, tiers of drones/meshes, etc. This information can be employed in determining, in conjunction with the selection information, a drone to provision in a mesh. In some embodiments, a drone mesh, e.g., mesh 580, can self-organize and/or self-optimize (SOSO). SOSO can be based on cataloged information via DAC 520. As such, multiple mesh drone communication, can allow dynamic adaptation of a mesh in response to changes in nearly any drone/mesh/mission characteristic or parameter. In an aspect, this can provide a level of redundancy on a mesh to accommodate unexpected events. Moreover, SOSO behavior can enable adaptation of meshes in a highly automated manner.

Figure 6:
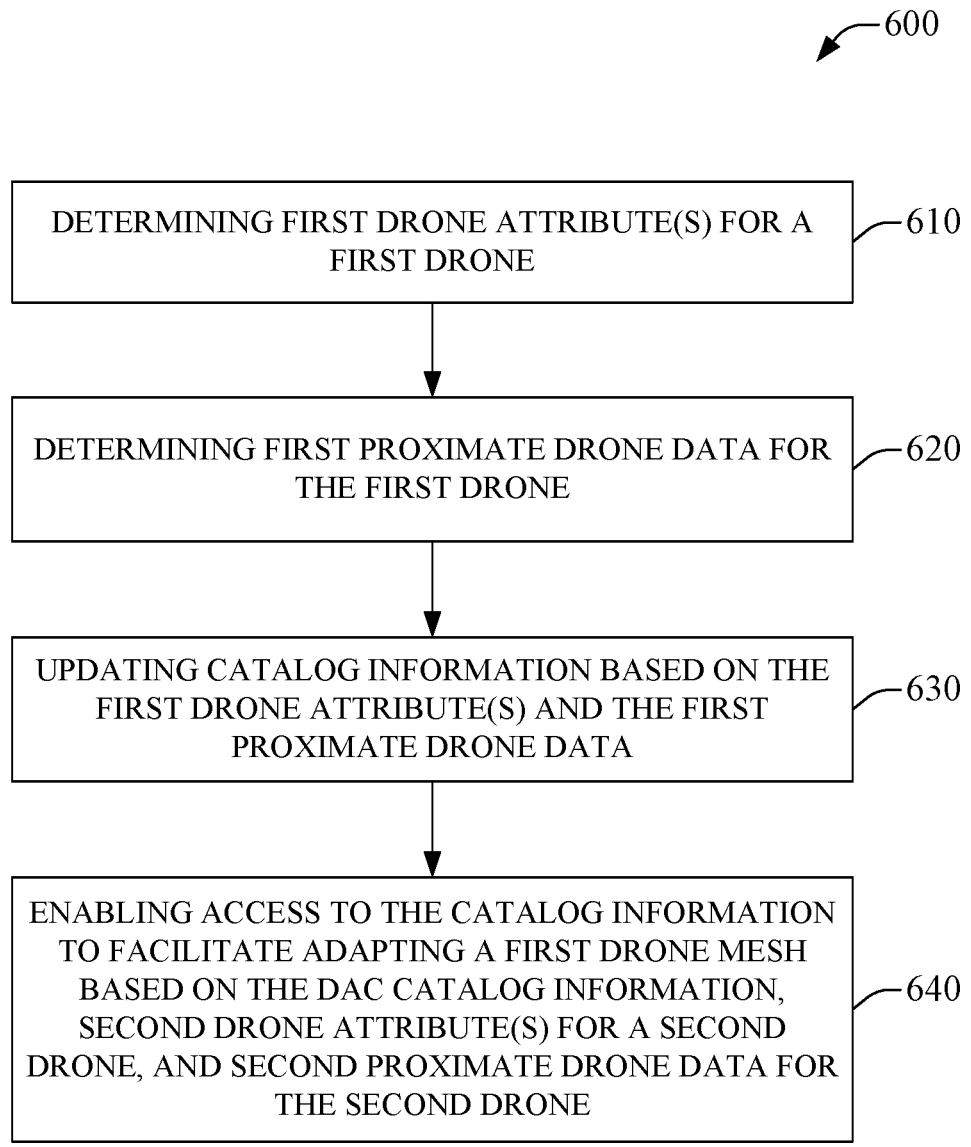
FIG. 6 illustrates an example method facilitating multiple mesh drone communication in accordance with aspects of the subject disclosure.
Figure 7:
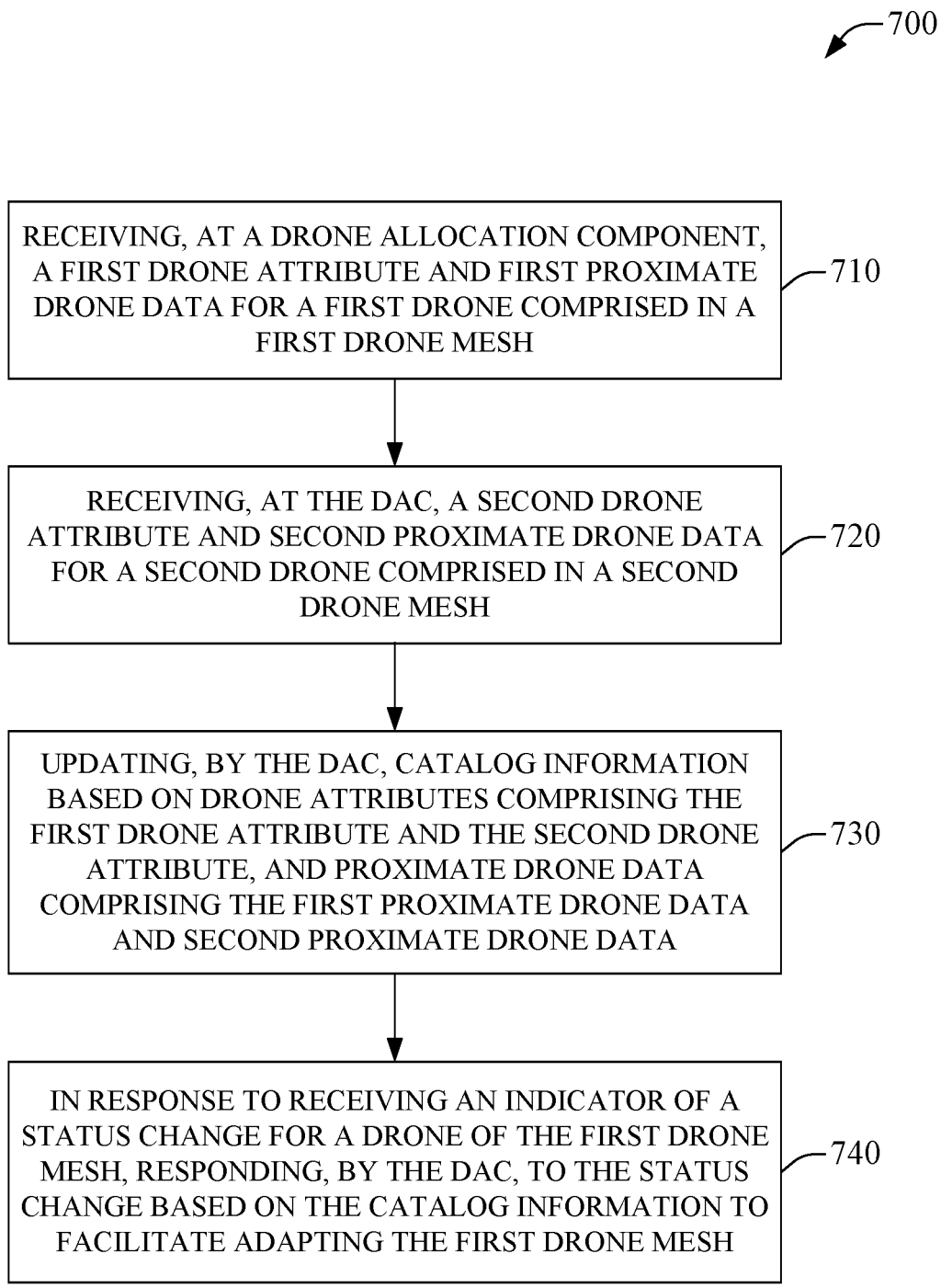
FIG. 7 depicts an example method facilitating multiple mesh drone communication via a drone allocation component in accordance with aspects of the subject disclosure.
Figure 8:
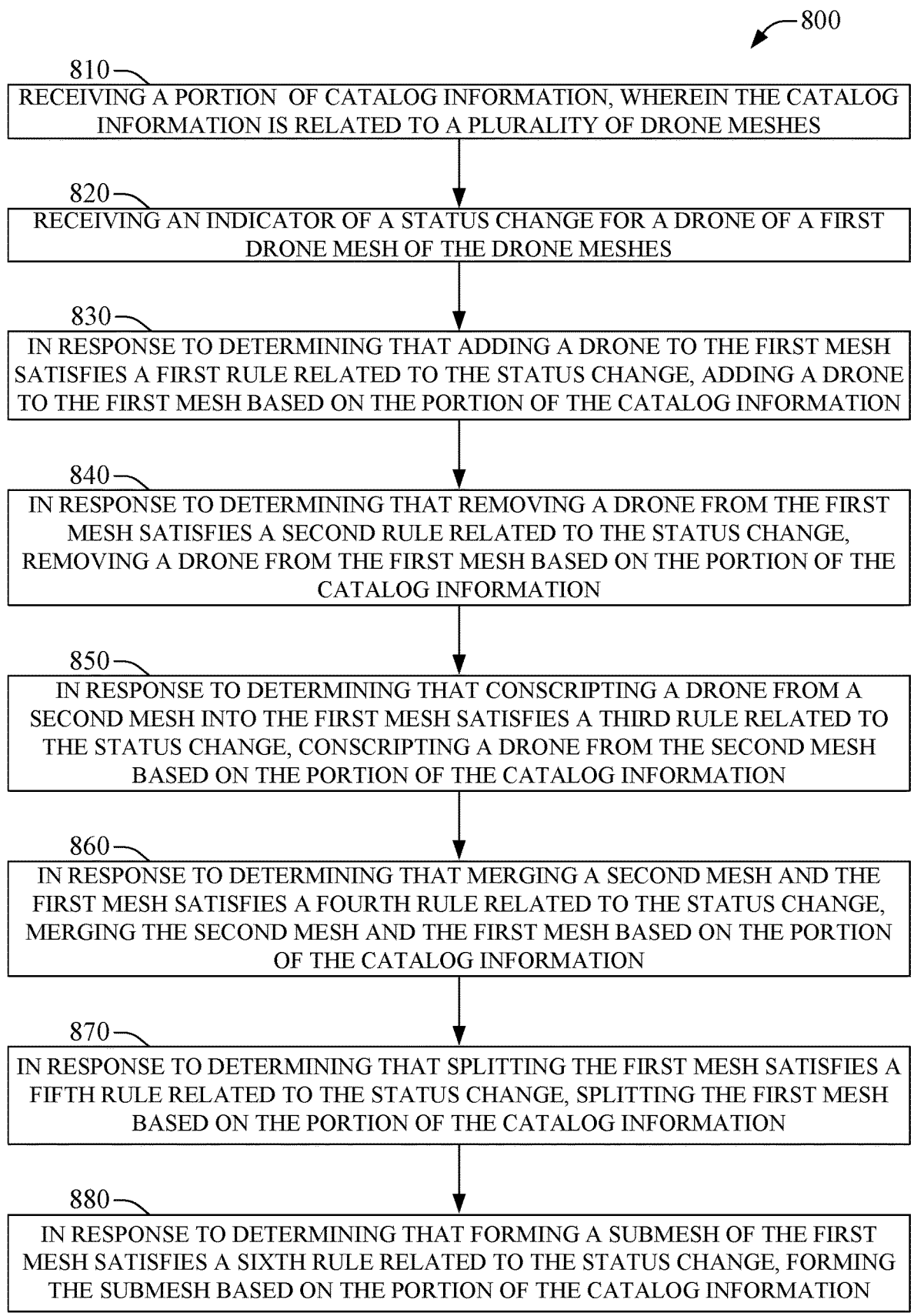
FIG. 8 illustrates an example method facilitating multiple mesh drone communication comprising drone mesh adaptation in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating multiple mesh drone communication in accordance with aspects of the subject disclosure. At 610, method 600 can comprise determining a first drone attribute(s) for a first drone. As drones, for land, sea, air, and/or space operation, become increasingly ubiquitous, can be determined to have attributes that make said drones attractive for inclusion in a drone mesh. Attributes can comprise sensor capabilities, drone characteristics, battery status, solar power status, operational envelopes of the drone, drone radio technology(ies), drone mesh membership(s), environment characteristic(s) of an environment(s) in which a drone is operating, etc. In an embodiment, attributes, e.g., characteristics, status, functionality, etc., can be determined by a self-analysis component of a drone. Attributes can further comprise a drone/owner name, address, phone number, identification information, account information, drone/owner/user profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone attributes.

At 620, method 600 can comprise determining first proximate drone data for the first drone. In an aspect, the first drone can discover, for example via a discovery component, other drone(s) proximate to the first drone. The discovered proximate drone data can comprise an identifier for the proximate drone(s), attributes, characteristics, status, missions, meshes of the proximate drone, etc. In an embodiment, the identifier can be used to gather historical information about the identified proximate drone.

At 630, method 600 can comprise updating catalog information based on the first drone attribute(s) and the first proximate drone data. The catalog of drone data can comprise data on one or more drones, which can each be part of, or affiliated with, one or more drone meshes. In an embodiment, the done data can be cataloged by a drone allocation component (DAC), e.g., DAC 120, 220, 32, 420, 520, etc. The catalog of drone data can provide information for analysis to facilitate determining which drones should be made part of a drone mesh to best accomplish a drone mission for a given set of circumstances. As an example, a drone mesh to photograph a wedding can comprise drones with cameras, drones with video/audio recording device, etc., whereby, the catalog of drone data can be analyzed to locate drones having these attributes that are available, located near to the planned event in time and space, are low cost, and capable of functioning for the prescribed length of the event. Where such drones are determined from the catalog, the drones can be provisioned for the mission. In an aspect, especially where many drones are available and can meet the requirements, drones can be rank ordered by one or more criteria, e.g., lowest to highest cost, highest to lowest reliability, quietest to noisiest, by camera/video/audio functions, etc., to afford selection of a best fit of individual drones and combinations of drones in a mesh for a given set of parameters. As an example, the wedding mesh can indicate three highly reliable, quiet electric drones, for $500, rather than eight, noisy gasoline drones for $100. Moreover, the drones can be provisioned from drones comprised in existing meshes or can be added to/removed from a mesh, or a new mesh can be formed based on the catalog data. As an example, where the wedding is occurring near to a movie shoot, drones of a drone mesh used in the movie shoot can be used in a drone mesh for the wedding event, such that when the drones are not being used for the movie shoot they can participate in the wedding event. This can optimize drone usage. Moreover, sharing of drones, or use of drone in multiple meshes can be facilitated by compliance with rules, for example, rules related to ensuring that drones are ready for use in a primary mission with a higher priority than a secondary mission, rules related to types of use, rules related to areas of use, etc. As such, the drones from the movie shoot example can be shared with the wedding event if they comply with a rule that assures that the shared drones are returned to the movie shoot at a determined time in advance of expected use on the movie shoot, e.g., to allow charging, cleaning, repair, and availability of the drones on the movie shoot.

At 640, method 600 can comprise, enabling access to the catalog information to facilitate adapting a first drone mesh based on the catalog information, second drone attribute(s) for a second drone, and second proximate drone data for the second drone. At this point method 600 can end. The first drone mesh can be adapted based on the catalog information in relation to attributes of another drone in the mesh, e.g., the second drone, and drones proximate to the second drone. As an example, where the first drone indicates that a battery level is low, and the second drone indicates normal operation and proximity to the first drone, the catalog information can be updated accordingly and can then be leveraged to adapt the mesh comprising the first and second drones to, for example, minimize power consumption of the first drone, substitute a third drone for the first drone to allow the first drone to return to a drone base for charging, share a drone with another mesh to accomplish the mission of the first mesh, etc.

FIG. 7 illustrates a method 700 that facilitates multiple mesh drone communication via a drone allocation component in accordance with aspects of the subject disclosure. At 710, method 700 can comprise receiving a first drone attribute for a first drone comprised in a first drone mesh. The first drone attribute can be received by a drone allocation component, such as described herein, e.g., DAC 120, 220, 32, 420, 520, etc. Attributes can comprise sensor capabilities, drone characteristics, battery status, solar power status, operational envelopes of the drone, drone radio technology, drone mesh membership, environment characteristic of an environment in which a drone is operating, a drone/owner name, address, phone number, identification information, account information, drone/owner/user profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in drone attributes. In an embodiment, attributes can be determined by a self-analysis component of a drone. Further, at 710, method 700 can also comprise the DAC receiving first proximate drone data for the first drone. In an aspect, the first drone can discover, for example via a discovery component, other drone(s) proximate to the first drone. The discovered proximate drone data can comprise an identifier for the proximate drone(s), attributes, characteristics, status, missions, meshes of the proximate drone, etc. In an embodiment, the identifier can be used to gather historical information about the identified proximate drone. At 720, method 700 can comprise receiving a second drone attribute and second proximate drone data for a second drone comprised in a second drone mesh.

At 730, method 700 can comprise updating, by the DAC, catalog information based on the first drone attribute, the first proximate drone data, the second drone attribute, and the second proximate drone data. The catalog of drone data can comprise data on one or more drones, e.g., the first drone and the second drone, which can each be part of, or affiliated with, one or more drone meshes, e.g., the first mesh and the second mesh. The catalog of drone data can provide information for analysis to facilitate determining which drones can be made part of a drone mesh to best accomplish a drone mission under a set of circumstances associated with a drone mission. Where such drones are determined from the catalog, the drones can be provisioned for the mission. In an aspect, especially where many drones are available and can meet the requirements, drones can be rank ordered by one or more criteria. Moreover, the drones can be provisioned from drones comprised in existing meshes or can be added to/removed from a mesh, or a new mesh can be formed based on the catalog data. This can allow drones to self-organize and/or self-optimize drone usage based on the catalog information. Moreover, sharing of drones, or use of drone in multiple meshes can be facilitated by compliance with rules, for example, rules related to ensuring that drones are ready for use in a primary mission with a higher priority than a secondary mission, rules related to types of use, rules related to areas of use, etc.

At 740, method 700 can comprise, receiving an indicator of a status change for a drone of the first mesh and, in response, facilitating, by the DAC, adapting the first drone mesh based on the catalog information. At this point method 700 can end. The first drone mesh can be adapted based on the catalog information, which comprises first and second drone attributes and first and second proximate drone discovery. As an example, where the first drone indicates that an engine is underperforming in relation to design specifications, the first drone mesh can be adapted, based on the catalog information, to augment the operations of the second drone by adding a third drone, removing the first drone, merging the first mesh with another mesh, etc., to facilitate completion of the mission of the first mesh.

FIG. 8 illustrates a method 800 that facilitates multiple mesh drone communication comprising drone mesh adaptation in accordance with aspects of the subject disclosure. At 810, method 800 can comprise receiving a portion of catalog information, wherein the catalog information is related to a plurality of drone meshes. The catalog information can comprise a drone attribute for a drone of a drone mesh of the plurality of drone meshes. An attributes can be a sensor capability, a drone characteristic, a battery status, a solar power status, an operational envelope of the drone, a drone radio technology, a drone mesh membership indicator, an environment characteristic of an environment in which the drone is operating, a drone/owner name, address, phone number, identification information, account information, drone/owner/user profile information, certifications information, logged hours or other training, mission parameters, such as, but not limited to, mission location, mission time, mission duration, mission type, mission payload, mission controller or interaction devices/services, level of autonomy, other drones/devices associated with the mission, etc., clearances, permits, approvals, waivers, mission path, mission locus resources available, e.g., power, fuel, internet connectivity, etc., historical drone use, additional operators/controllers, etc. It will be noted that nearly any pertinent information can be included in a drone attribute. In an embodiment, attributes can be determined by a self-analysis component of a drone.

Method 800, at 820, can comprise receiving an indicator of a status change for a drone of a first drone mesh of the drone meshes. A status change of the drone can correspond to a change in an characteristic or attribute of the drone, such as, loss of communication with the drone, indications of drone failure or under performance, change in location of drone, change in an environment in which the drone is operating, e.g., weather change, temperature change, change in pressure, change in lighting, change in depth/altitude, etc., change in membership of the drone mesh, etc. The status change can relate to changed conditions related to completion of a mission of the first drone mesh that can indicate that adaptation of the first drone mesh can increase a likelihood of mission completion.

At 830, method 800 can comprise adding a drone to the first drone mesh, based on the portion of the catalog information, in response to determining that adding a drone to the first drone mesh satisfies a first rule related to the status change. In an embodiment, a drone of the first drone mesh can determine that the first rule is satisfied and, in response can initiate adding a drone to the first drone mesh. In another embodiment, a DAC can determine that the first rule is satisfied and, in response can initiate adding a drone to the first drone mesh. In a further embodiment, another device can determine that the first rule is satisfied and, in response can initiate adding a drone to the first drone mesh.

At 840, method 800 can comprise removing a drone from the first drone mesh, based on the portion of the catalog information, in response to determining that removing a drone from the first drone mesh satisfies a second rule related to the status change. In an embodiment, a drone of the first drone mesh can determine that the second rule is satisfied and, in response can initiate removing a drone from the first drone mesh. In another embodiment, a DAC can determine that the second rule is satisfied and, in response can initiate removing a drone from the first drone mesh. In a further embodiment, another device can determine that the second rule is satisfied and, in response can initiate removing a drone from the first drone mesh.

At 850, method 800 can comprise conscripting a drone from a second drone mesh into the first drone mesh, based on the portion of the catalog information, in response to determining that conscripting the drone from the second drone mesh satisfies a third rule related to the status change. In an embodiment, a drone of the first drone mesh can determine that the third rule is satisfied and, in response can initiate conscripting the drone from the second drone mesh. In another embodiment, a DAC can determine that the third rule is satisfied and, in response can initiate conscripting the drone from the second drone mesh. In a further embodiment, another device can determine that the third rule is satisfied and, in response can initiate conscripting the drone from the second drone mesh.

At 860, method 800 can comprise merging a second drone mesh into the first drone mesh, based on the portion of the catalog information, in response to determining that merging the second drone mesh and the first drone mesh satisfies a fourth rule related to the status change. In an embodiment, a drone of the first drone mesh can determine that the fourth rule is satisfied and, in response can initiate merging the first and second drone mesh. In another embodiment, a DAC can determine that the fourth rule is satisfied and, in response can initiate merging the first and second drone mesh. In a further embodiment, another device can determine that the fourth rule is satisfied and, in response can initiate merging the first and second drone mesh.

At 870, method 800 can comprise splitting the first drone mesh, based on the portion of the catalog information, in response to determining that splitting the first drone mesh satisfies a fifth rule related to the status change. In an embodiment, a drone of the first drone mesh can determine that the fifth rule is satisfied and, in response can initiate splitting the first drone mesh. In another embodiment, a DAC can determine that the fifth rule is satisfied and, in response can initiate splitting the first drone mesh. In a further embodiment, another device can determine that the fifth rule is satisfied and, in response can initiate splitting the first drone mesh.

At 880, method 800 can comprise forming a submesh of the first drone mesh, based on the portion of the catalog information, in response to determining that forming a submesh of the first drone mesh satisfies a sixth rule related to the status change. At this point method 800 can end. In an embodiment, a drone of the first drone mesh can determine that the sixth rule is satisfied and, in response can initiate forming the submesh of the first drone mesh. In another embodiment, a DAC can determine that the sixth rule is satisfied and, in response can initiate forming the submesh of the first drone mesh. In a further embodiment, another device can determine that the sixth rule is satisfied and, in response can initiate forming the submesh of the first drone mesh.

In an embodiment, the catalog information can be determined by a DAC, e.g., DAC 120, 220, 320, 420, 520, etc. The cataloging can be based on a characteristic, an attribute, a functionality, etc., of a drone of the first mesh. The cataloging can be based on a characteristic or parameter of a mission of the first drone mesh. The cataloging can be based on an environmental characteristic or condition of an operating environment of the first drone mesh, or an expected environment of the first drone mesh during execution of a mission of the drone mesh. In some embodiments, drones can be part of one or more drone meshes. In an aspect, drones of the multiple meshes can communication with other drones of the same or different meshes to facilitate communication of information to a DAC for cataloging and to facilitate receiving the portion of the catalog information to enable adapting the first drone mesh. In some embodiments, the first drone mesh can SOSO based on the portion of the catalog information received at 810. SOSO can comprise adding, removing, conscripting, sharing, merging, splitting, forming a submesh, etc., to adapt the first drone mesh to response to the receiving the indicator of the status change received at 820.

Figure 9:
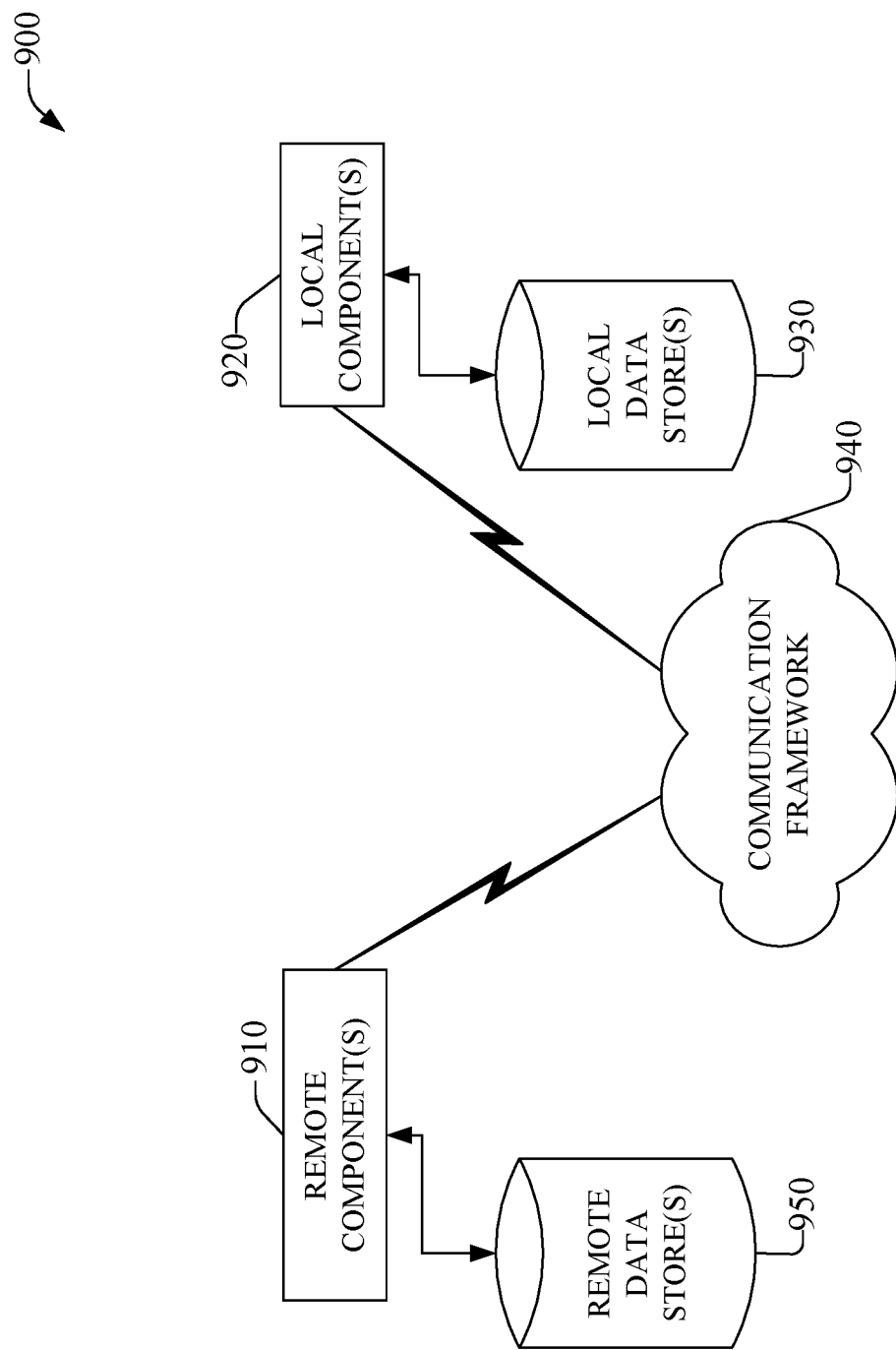
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be DAC 120, 220, 320, 420, 520, etc., access point 292, RAN device 294, etc., drone base 594, etc.

The system 900 also includes one or more local component(s) 920. The local component(s) 920 can be hardware and/or software (e.g., threads, processes, computing devices). In some embodiments, local component(s) 920 can include, for example, drone 110, 210-213, 310-313, 350-351, 410-413, 450-451, 460-463, 470, 510-513, 550-553, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
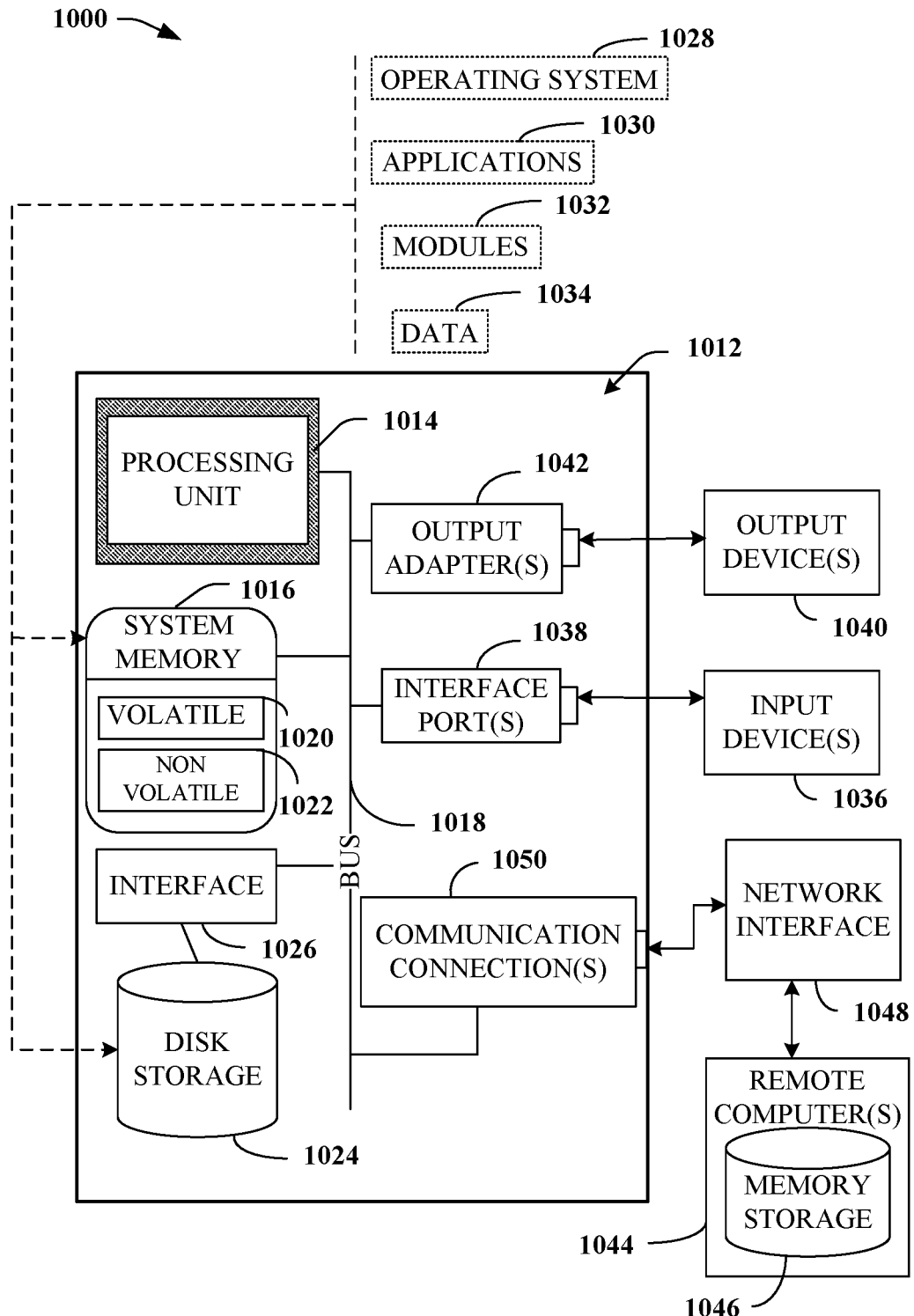
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of DAC 120, 220, 320, 420, 520, etc., access point 292, RAN device 294, etc., drone base 594, etc., drone 110, 210-213, 310-313, 350-351, 410-413, 450-451, 460-463, 470, 510-513, 550-553, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving drone information drone, e.g., drone 110, 210-213, 310-313, 350-351, 410-413, 450-451, 460-463, 470, 510-513, 550-553, etc., and in response to the receiving drone information, cataloging the drone information to facilitate determining drone provisioning information to enable provisioning of a drone mesh.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user preference information, etc., and can be embodied in a touch sensitive display panel, a mouse input GUI, a command line controlled interface, etc., allowing a user to interact with computer 1012. As an example, UI Component 584 can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, user input can be captured in relation to drone mission parameters, drone ranking rules, drone provisioning rules, etc., to enable use of drones, e.g., drone 110, 210-213, 310-313, 350-351, 410-413, 450-451, 460-463, 470, 510-513, 550-553, etc., in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a first drone device of a first group of drone devices corresponding to a first mission, wherein the first drone device comprises a first functionality;
determining a second drone device of a second group of drone devices corresponding to a second mission, wherein the second drone device comprises a second functionality, wherein the second functionality is determined to be substitutable for the first functionality, and wherein the first mission is a different mission than the second mission; and
causing adaptation of the first group of drone devices, wherein the adaptation comprises adding the second drone device to the first group of drone devices.

2. The system of claim 1, wherein causing the adaptation further comprises removing the first drone device from the first group of drone devices.

3. The system of claim 1, wherein the second drone device remains in the second group of drone devices.

4. The system of claim 1, wherein the second drone device is removed from the second group of drone devices.

5. The system of claim 1, wherein causing the adaptation is triggered by the first drone device being removed from the first group of drone devices.

6. The system of claim 1, wherein causing the adaptation is triggered by the first functionality of the first drone device being less available.

7. The system of claim 1, wherein causing the adaptation is initiated by determining that the first drone device is to be removed from the first group of drone devices.

8. The system of claim 1, wherein causing the adaptation is initiated by determining that the first functionality of the first drone device is to become less available.

9. The system of claim 1, wherein the second functionality is a same functionality as the first functionality.

10. The system of claim 1, wherein the second functionality comprises the first functionality and an additional functionality other than the first functionality.

11. The system of claim 1, wherein the second functionality is an increased functionality that performs a function of the first functionality in an increased manner.

12. The system of claim 1, wherein the adaptation comprises temporarily adding the second drone device to the first group of drone devices.

13. The system of claim 12, wherein temporarily adding the second drone device to the first group of drone devices is for a designated time.

14. The system of claim 12, wherein temporarily adding the second drone device to the first group of drone devices is until a condition is determined to be satisfied.

15. A method, comprising:
determining, by a system comprising a processor, a first functionality of a first drone of a first drone mesh is substitutable by a second functionality of a second drone of a second drone mesh, wherein the first drone mesh is participating in accomplishing a first goal, wherein the second drone mesh is participating in accomplishing a second goal, and wherein the first goal is a different goal than the second goal; and
in response to determining a change in a status of the first drone, initiating, by the system, adaptation of the first drone mesh, wherein the adaptation comprises adding the second drone to the first drone mesh.

16. The method of claim 15, wherein the adaptation further comprises removing the second drone from the second drone mesh.

17. The method of claim 15, wherein determining the change in the status of the first drone comprises determining that the first functionality will become unavailable.

18. A non-transitory computer-readable storage device having executable instructions stored thereon that, in response to execution, cause a device including a processor to perform operations, comprising:
- determining a first functionality of a first drone of a first drone mesh facilitating performance of a first task package;
- determining a second functionality of a second drone of a second drone mesh is substitutable for the first functionality of the first drone of the first mesh, wherein the second drone mesh facilitates performance of a second task package; and
- initiating adaptation of the first drone mesh, wherein the adaptation comprises adding the second drone to the first drone mesh, and wherein the first task package is a different task package than the second task package.

19. The non-transitory computer-readable storage device of claim 18, wherein the adaptation further comprises removing the second drone from the second drone mesh.

20. The non-transitory computer-readable storage device of claim 18, wherein the adaptation further comprises removing the first drone from the first drone mesh.

* * * * *